(12) United States Patent
Tsuchino et al.

(10) Patent No.: US 8,040,765 B2
(45) Date of Patent: Oct. 18, 2011

(54) INITIALIZATION METHOD FOR INFORMATION RECORDING MEDIUM, INITIALIZATION APPARATUS FOR INFORMATION RECORDING MEDIUM, AND INFORMATION RECORDING MEDIUM

(75) Inventors: Akio Tsuchino, Osaka (JP); Kenichi Nishiuchi, Osaka (JP); Noboru Yamada, Osaka (JP); Rie Kojima, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/741,113

(22) PCT Filed: Sep. 2, 2009

(86) PCT No.: PCT/JP2009/004316
§ 371 (c)(1),
(2), (4) Date: May 3, 2010

(87) PCT Pub. No.: WO2010/026744
PCT Pub. Date: Mar. 11, 2010

(65) Prior Publication Data
US 2010/0254233 A1   Oct. 7, 2010

(30) Foreign Application Priority Data
Sep. 5, 2008   (JP) .................................. 2008-227924

(51) Int. Cl.
*G11B 7/00* (2006.01)
(52) U.S. Cl. ......................... 369/44.27; 369/94; 369/121
(58) Field of Classification Search ........................ None
See application file for complete search history.

(56) References Cited

U.S. PATENT DOCUMENTS

| | | | |
|---|---|---|---|
| 5,278,011 A | 1/1994 | Yamada et al. | |
| 6,268,107 B1 | 7/2001 | Yamada et al. | |
| 6,807,142 B1 | 10/2004 | Nagata et al. | |
| 2003/0012115 A1 | 1/2003 | Akiyama et al. | |
| 2003/0152002 A1* | 8/2003 | Hattori et al. | 369/53.22 |
| 2004/0148622 A1* | 7/2004 | Kurokawa et al. | 720/718 |
| 2004/0246881 A1* | 12/2004 | Sakaue et al. | 369/275.2 |
| 2006/0292499 A1 | 12/2006 | Akiyama et al. | |

FOREIGN PATENT DOCUMENTS

| | | |
|---|---|---|
| JP | 63-225934 | 9/1988 |
| JP | 63-225935 | 9/1988 |
| JP | 2001-23236 | 1/2001 |
| JP | 2001-207297 | 7/2001 |
| JP | 2003-22538 | 1/2003 |
| JP | 2003-272172 | 9/2003 |
| JP | 2004-5865 | 1/2004 |
| JP | 2004-13988 | 1/2004 |
| JP | 2005-92927 | 4/2005 |
| WO | 2009/072238 | 6/2009 |

OTHER PUBLICATIONS

International Search Report issued Nov. 10, 2009 in International (PCT) Application No. PCT/JP2009/004316.

* cited by examiner

*Primary Examiner* — Paul Huber
(74) *Attorney, Agent, or Firm* — Wenderoth, Lind & Ponack, L.L.P.

(57) ABSTRACT

According to the present invention, a recording film is partially initialized using a first light beam (A) having a wavelength for initialization, focus adjustment is performed using a second light beam (B) having a wavelength corresponding to a wavelength for recording and reproducing information on and from an information recording medium, and then the recording film is initialized using the first light beam (A), thereby it is possible to securely initialize recording films of all information layers of a multilayer information recording medium.

26 Claims, 14 Drawing Sheets

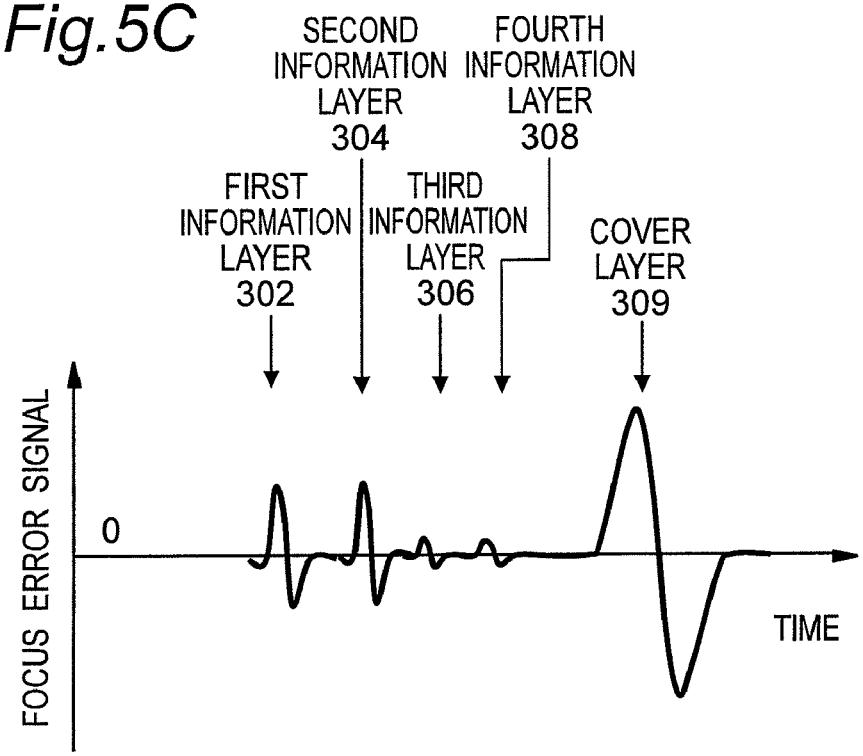
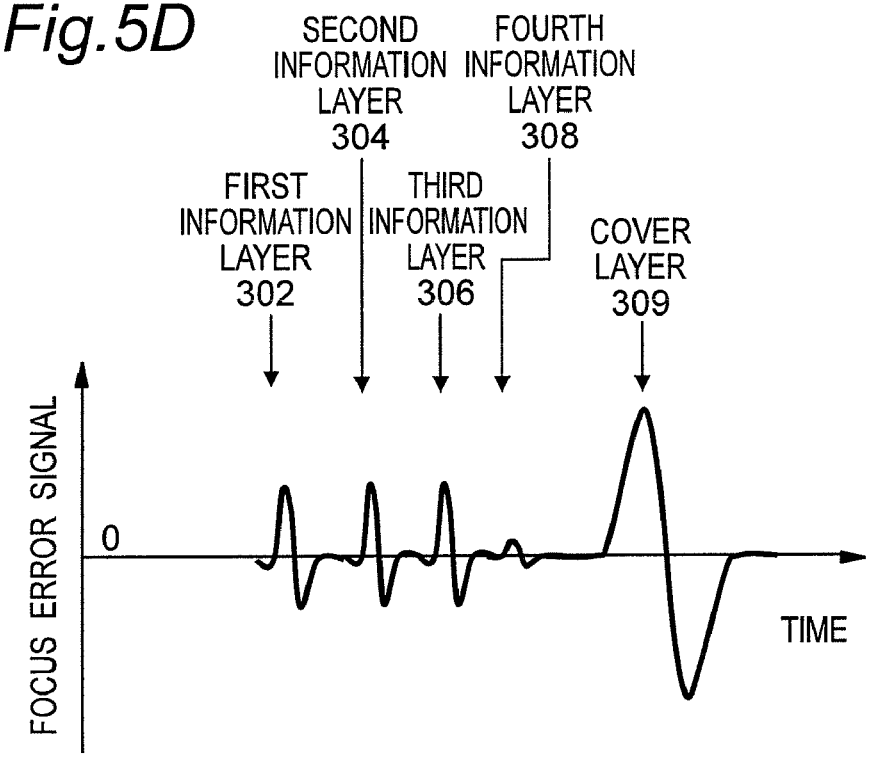

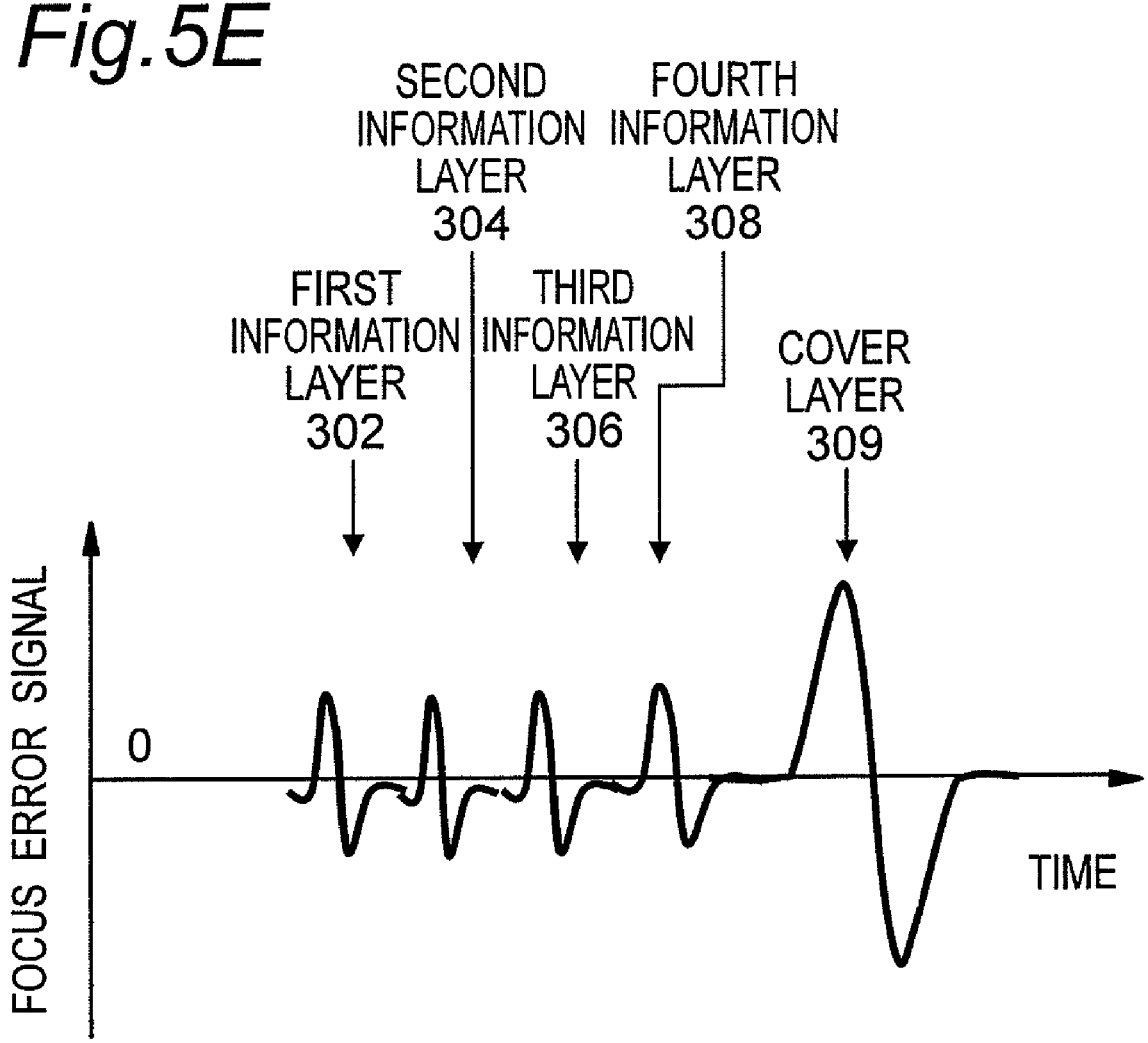

INITIALIZATION METHOD FOR INFORMATION RECORDING MEDIUM, INITIALIZATION APPARATUS FOR INFORMATION RECORDING MEDIUM, AND INFORMATION RECORDING MEDIUM

This application is a 371 of PCT/JP2009/004316, filed Sep. 2, 2009.

TECHNICAL FIELD

The present invention relates to an information recording medium that performs recording and/or reproduction (hereinafter, described as recording and reproduction) of information by irradiation with laser light or the like, and particularly to an initialization method for an image recording medium including a multilayer recording film, an initialization apparatus for the information recording medium, and the information recording medium.

BACKGROUND ART

As one example of an information recording medium, there is a phase change type information recording medium including a recording film on which recording, erasure and rewriting of information are performed by optical means using laser light. The recording, erasure, and rewriting for the phase change type information recording medium are performed using the occurrence of reversible change in a phase change material between a crystal and an amorphous material in the recording film. To be more specific, generally, the recording of information is conducted by amorphizing part of the recording film to form a recording mark, and the erasure is conducted by crystallizing the recording mark. The amorphization is performed by heating the recording film to a temperature which is equal to or more than a melting point, and then rapidly cooling the same. On the other hand, the crystallization is performed by heating the recording film to a temperature which is equal to or more than a crystallization temperature and is equal to or less than the melting point or heating the same to a temperature which is equal to or more than the melting point, and then gradually cooling the same.

As one example of the phase change type information recording medium, there is an information recording medium such as a "Blu-ray Disc" currently commercialized. This "Blu-ray Disc" is used as an information recording medium corresponding to digital hi-vision broadcasting (High definition television broadcasting), and some of them have recording densities of 25 GB (one layer), and 50 GB (single-side double-layer), and a transfer rate of 36 Mbps (regular speed). As a material for a recording film in a regular-speed rewriting-type Blu-ray Disc, for example, a solid solution of GeTe and $Sb_2Te_3$ (refer to Patent Document 1) or a solid solution of GeTe and $Bi_2Te_3$ obtained by replacing Sb by Bi (refer to Patent Document 2) is used.

In the "Blu-ray Disc", a sputtering method is typically used to form the above-described recording film, a reflection film, and a dielectric film. The phase change thin film formed by this sputtering method, in most cases, is in an amorphous state. Accordingly, in the "Blu-ray Disc", before recording information, the entire recording film in the data region of the information recording medium needs to be crystallized. Processing for crystallizing the entire recording film in the amorphous state is referred to as initialization.

In the information recording medium, recently, shortening of a light beam for recording and reproduction has been advanced to process more information at a higher speed to accumulate a large amount of information. This leads to the use of laser light of 405 nm (400 to 410 nm) as in the foregoing "Blu-ray Disc". Moreover, in order to reduce manufacturing cost, a reduction in time required for the initialization for crystallizing the entire recording film has been demanded. For this reason, a configuration is necessary, in which a wide range of the recording film can be initialized in a short time using the light beam in a large spot shape having a predetermined power. Accordingly, laser light having a wavelength of 810 nm (800 to 820 nm) which easily brings about high output is used as the light beam for initialization.

FIG. 9 is a schematic diagram showing a general configuration of a conventional initialization apparatus. As shown in FIG. 9, an information recording medium 209 is irradiated with a light beam A from an optical head 200, so that a recording film of the information recording medium 209 is initialized. In FIG. 9, in a light source 201 emitting the light beam A having a wavelength of 810 nm, an output power of the light source 201 is controlled by a laser drive circuit 208. The light beam A emitted from the light source 201 passes through a light path correction means 206 and a collimator lens 207, and is reflected in a beam splitter 203. The light beam A reflected in the beam splitter 203 passes through an objective lens 205, and reaches the information recording medium 209. The light beam A reflected in the recording film or the like of the information recording medium 209 again passes through the objective lens 205, and enters a focus error detector 210. At this time, an electric signal indicating the light beam A detected in the focus error detector 210 is inputted to a focus error signal generation circuit 211. The focus error signal generation circuit 211 forms a focus error signal, and outputs the focus error signal to a focus servo circuit 212. The focus servo circuit 212 drives a voice coil 204, based on the focus error signal to adjust a position of the objective lens 205. In this manner, the focus servo circuit 212 drives the voice coil 204 to perform the position adjustment of the objective lens 205, so that the light beam A is focused on a predetermined recording film of the information recording medium 209. The laser drive circuit 208 and the focus servo circuit 212 are controlled by a controller 213 (refer to Patent Document 3).

Patent Document 3 discloses an initialization method for an information recording medium including two information layers as an information layer having a recording film, in the initialization apparatus configured as described above.

PRIOR ART DOCUMENTS

Patent Documents

Patent Document 1: JP-A 63-225934
Patent Document 2: JP-A 63-225935
Patent Document 3: JP-A 2004-5865

SUMMARY OF THE INVENTION

Problems to be Solved by the Invention

In order to enhance a recording density of an information recording medium, in addition to the shortening of a wavelength of a light beam for recording and reproduction, a multilayer information recording medium including a plurality of information layers (recording films), specifically, more than two layers, that is, three or more layers has been developed. In the multilayer information recording medium, by irradiating one surface of the information recording medium with a light beam, information is recorded on the recording films of the respective information layers, and information recorded on the respective recording films is reproduced.

FIG. 10 is a section diagram showing one example of a schematic configuration of the multilayer information recording medium. In the cross section of FIG. 10, the multilayer information recording medium 300 is a multilayer information recording medium including four information layers. The multilayer information recording medium 300 shown in FIG. 10 is configured to include a substrate 301 made of polycarbonate, a first information layer 302, a first transparent separation layer 303, a second information layer 304, a second transparent separation layer 305, a third information layer 306, a third transparent separation layer 307, a forth information layer 308, and a cover layer 309 made of an ultraviolet curing resin. In the respective information layers, recording films are formed. The light beam for recording and reproduction radiates from a cover layer 309 side to perform the recording and reproduction with respect to the recording films of the respective information layers.

In the multilayer information recording medium shown in FIG. 10, the sputtering method is also used for film formation, and most of the recording films, which are phase change thin films, in the respective information layers (302, 304, 306, 308) formed by the sputtering method are in the amorphous state. Accordingly, before the information is recorded, data regions as recording and reproducing regions in the recording films of the multilayer information recording medium need to be entirely crystallized in advance.

Patent Document 3 described above discloses the initialization method for the information recording medium including the two information layers as the plurality of information layers. However, in the initialization method disclosed in Patent Document 3, with regard to the initialization of an information recording medium including a plurality of layers, specifically, more than two layers, that is, three or more layers, so-called multiple information layers, it is very difficult to perform secure initialization processing to all the layers. Particularly, in the multilayer information recording medium, it is very difficult to perform secure initialization of an intermediate information layer between an information layer at a farthest position from a surface through which a light beam enters (information layer on the back side) and an information layer at a nearest position (information layer on the front side). In the information recording medium including a plurality of layers, specifically, three or more layers, that is, so-called multiple information layers, a distance between the respective information layers is very short, which makes it nearly impossible to specify a position of the above-described intermediate information layer to securely perform the initialization processing only to the intermediate layer.

In the case of the multilayer information recording medium, since the light beam reaching the multilayer information recording medium passes through the respective information layers, the light beam is affected by transmissivity of the respective information layers to gradually attenuate each time it passes through the information layers. Moreover, in the multilayer information recording medium, the transmissivity of each of the information layers is set to be high and a thickness is set to be small so that the light beam securely passes through the information layer. This reduces an amount of reflected light, and lowers a level of the focus error signal in each of the information layers, which makes discrimination from noise difficult. As a result, it is very difficult to detect, with high accuracy, the information layer of interest from the position of each of the layers in the multilayer information recording medium based on the focus error signal, so that it is nearly impossible to securely specify and initialize the information layer of interest.

As described above, it is very difficult to perform focus adjustment at the position of the recording film of each of the information layers with high accuracy to perform the initialization to the information recording medium including so-called multiple information layers by using the conventional initialization method, and thus, it is impossible to completely initialize the recording films of all the information layers.

Hereinafter, consideration of the initialization method for the multilayer information recording medium 300 including four information layers (recording films) shown in FIG. 10 was conducted based on various experimental results by the present inventor, and a description thereof is now given.

In order to perform the initialization processing using the multilayer information recording medium 300 shown in FIG. 10, the present inventor used an optical head, which is an optical device for emitting a light beam having a wavelength of 810 nm.

Normally, in the initialization processing to the multilayer information recording medium, it is an efficient, preferable initialization method to sequentially perform the initialization from the information layer on the back side in the position farthest from an incidence surface of the light beam from the optical head toward the front side in the nearer position to the incidence surface of the light beam. Accordingly, in the multilayer information recording medium 300 shown in FIG. 10, the initialization processing is sequentially performed in the order of the first information layer 302, the second information layer 304, the third information layer 306, and the fourth information layer 308, from the information layer on the substrate 301 side (the back side farthest from the light-beam incidence surface) to the cover layer 309 side (the front side nearest to the incidence surface of the light beam).

In the initialization processing, in order to irradiate the first information layer 302 farthest from the incidence surface of the light beam, the light beam passes through the second information layer 304, the third information layer 306 and the fourth information layer 308. In this manner, each time the light beam passes through the second information layer 304, the third information layer 306 and the fourth information layer 308, the light beam from the optical head gradually attenuates. Because of this, the amount of the reflected light from the first information layer 302 when the first information layer 302 farthest from the light beam incidence surface is irradiated with the light beam in the multilayer information recording medium 300 is further smaller than that in a single-layer information recording medium including only one information layer. Moreover, the remaining information layers 304, 306 and 308 are each made of a material with a high transmissivity because the attenuation caused when the light beam passes through the respective information layers 304, 306 and 308 needs to be suppressed. Accordingly, the amounts of the reflected light from the respective information layers 304, 306 and 308 are obviously small. In experiments by the present invention, the amounts of the reflected light from the respective information layers 304, 306 and 308 when the multilayer information recording medium 300 is irradiated with the light beam having the wavelength of 810 nm are small, and do not reach a threshold value set in advance, and thus, differentiation from noise in the detected focus error signal is very difficult.

As described above, the small amounts of the reflected light from the respective information layers 304, 306 and 308 lead to low levels of the focus error signal generated based on the amount of the reflected light. As a result, it is very difficult to adjust a focus onto the positions of the recording films of the respective information layers 304, 306, 308, based on the generated focus error signal.

FIGS. 11A to 11E show the focus error signal when the information recording medium 300 including the four information layers shown in FIG. 10 is irradiated with the light beam having the wavelength of 810 nm (infrared). The multilayer information recording medium 300 used here is an information recording medium that records and reproduces information using a light beam of 405 nm (400 to 410 nm).

While the initialization of the second information layer 304 and the third information layer 306 is performed below, the initialization is performed immediately after the respective information layers are experimentally formed.

FIG. 11A shows the focus error signal detected in a state before all the information layers 302, 304, 306, 308 are initialized. As shown in FIG. 11A, the level of the focus error signal of the first information layer 302 on the backmost side, which is the farthest position from the incidence surface of the light beam in the multilayer information recording medium 300, has a highest value. Since the light beam does not need to pass through the first information layer 302 on the backmost side, the amount of the reflected light thereof is relatively large. Depending on some film constitutions (including a film thickness, and an optical constant) of the first information layer 302, the amount of reflected light before the initialization becomes larger than that after the initialization.

FIG. 11B shows the focus error signal in a state after initializing the first information layer 302, and before initializing the next second information layer 304. That is, the focus error signal shown in FIG. 11B is in a state where the second information layer 304, the third information layer 306 and the fourth information layer 308 have not been initialized.

As shown in FIG. 11B, since the amount of reflected light from the second information layer 304 is small, the level of the focus error signal in the second information layer 304 is very low. Accordingly, it is not easy to adjust a focus onto the position of the second information layer 304, and it is difficult to securely perform the initialization processing to the second information layer 304.

FIG. 11C shows the focus error signal in a state after initializing the first information layer 302 and the second information layer 304, and before initializing the next third information layer 306. That is, the focus error signal shown in FIG. 11C is in a state where the third information layer 306 and the fourth information layer 308 have not been initialized. As shown in FIG. 11C, since the amount of the reflected light from the third information layer 306 is small, the level of the focus error signal in the third information layer 306 is very low.

FIG. 11D shows the focus error signal in a state after initializing the first information layer 302, the second information layer 304 and the third information layer 306, and before initializing the next fourth information layer 308. As shown in FIG. 11D, since the amount of reflected light from the fourth information layer 308 is small, the level of the focus error signal in the fourth information layer 308 is very low.

FIG. 11E shows the focus error signal upon irradiation with the light beam having the wavelength of 810 nm in a state where all the information layers 302, 304, 306 and 308 are initialized.

As described above, in the focus error signal upon irradiation of the information recording medium 300 including the four information layers (the recording films) with the light beam having the wavelength of 810 nm, since the level in the information layer to be subjected to the initialization processing is low, it is not easy to focus the light beam on the position of the information layer (recording film) of interest. Consequently, it is very difficult to securely perform the initialization processing on the information layer (the recording film) of interest.

As to the above-described experimental results, although the experiments were performed using a light beam having a different wavelength, for example, a light beam having a wavelength of 680 nm (red), similar results were obtained.

Patent Document 3 described above discloses a method in which in initialization processing for an information recording medium including two information layers, the information layer on the back side in the two information layers (information layer on the side far from the light beam incidence surface) is initialized, and then, before the information layer on the front side (information layer near to the light beam incidence surface) is initialized, a position of a region where the information layer on the front side exists (a range of a thickness of 100 µm) is specified, and part of the information layer on the front side is initialized.

As described above, according to the initialization information disclosed in Patent Document 3, it is considered that the region where the information layer to be initialized exists is assumed before the initialization processing of the information layer of interest, and the assumed region is irradiated with the light beam for initialization, so that the information layer of interest is partially initialized. However, although the above-described initialization processing method is enabled to the information recording medium including the two information layers, the initialization processing is very difficult, and is nearly impossible to be performed on the multilayer information recording medium including three or more information layers for the following reasons.

As in the multilayer information recording medium 300 including the four information layers shown in FIG. 10, in the multilayer information recording medium including three or more information layers, the thickness of each of the transparent separation layers 303, 305 and 307 is 30 µm or less, which is very thin. Moreover, a size of wobbling, which is distortion in the multilayer information recording medium 300 is normally 30 µm or more. Therefore, there is a problem that even if, for example, the position of the second information layer 304 as the information layer to be initialized is assumed and is irradiated with the light beam for initialization, the third information layer 306 and the fourth information layer 308 are also irradiated with the light beam, so that the third information layer 306 and the fourth information layer 308 are initialized in addition to the second information layer 304.

Moreover, as described before, when the second information layer 304 is irradiated with the light beam, the light beam needs to pass through the third information layer 306 and the fourth information layer 308, power of the light beam necessarily becomes large in view of the attenuation in the third information layer 306 and the fourth information layer 308. This causes the third information layer 306 and the fourth information layer 308 to be unnecessarily initialized by the light beam.

When the third information layer 306 and the fourth information layer 308 have been initialized, the transmissivities of the third information layer 306 and the fourth information layer 308 with respect to the light beam having the wavelength of 810 nm turn into a half, resulting in large reduction (for example, refer to FIGS. 11D and 11E). As a result, the amount of reflected light in the second information layer 304 is largely reduced, and the level of the focus error signal is put into a very low state.

As described above, it is very difficult to stably and securely initialize all the information layers (recording films) of the multilayer information recording medium including the plurality of information layers, specifically, three or more information layers, using the conventional initialization method, and the complete initialization to the multilayer information recording medium is nearly impossible.

An object of the present invention is to provide an initialization method enabling all information layers (recording films) of a multilayer information recording medium including a plurality of information layers, particularly three or more information layers to be stably and securely initialized, an initialization apparatus that conducts the initialization method, and a highly reliable multilayer information recording medium securely initialized.

Solutions to the Problems

An initialization method for an information recording medium according to a first aspect of the present invention is an initialization method for initializing an information recording medium including at least two or more information layers. The initialization method includes: a step of partially initializing a region of a recording film of the information layer through use of a first light beam having a wavelength for initialization; a step of irradiating the region of the recording film subjected to the partial initialization with a second light beam having a wavelength corresponding to a wavelength for recording and reproducing information on and from the information recording medium; a step of adjusting a focus position, based on a focus error signal generated from light which is reflected from the information layer irradiated with the second light beam, and a step of initializing the recording film in such a manner that the information recording medium is irradiated with the first light beam having the focus position adjusted. The initialization method including the steps described above allows stable and secure initialization of the recording films of all the information layers of the multilayer information recording medium.

An initialization method for an information recording medium according to a second aspect of the present invention may be configured as follows. That is, in the first aspect, in the step of partially initializing the region of the recording film through use of the first light beam, the first light beam is used for partially initializing an initialization region for focus adjustment except a recording and reproducing region in the recording film, and in the step of irradiating the information recording medium with the second light beam, the initialization region for focus adjustment, which is partially initialized, is irradiated with the second light beam.

An initialization method for an information recording medium according to a third aspect of the present invention may be configured as follows. That is, in the second aspect, the number of information layers in the information recording medium is N (N: an integer which is equal to or more than 3).

An initialization method for an information recording medium according to a fourth aspect of the present invention may be configured as follows. That is, in the first aspect, in a case where the number of information layers in the information recording medium is N (N: an integer which is equal to or more than 3), and the first information layer, . . . , the n-th information layer (n: an integer which satisfies a relation of 2≦n<N), . . . , and the N-th information layer are arranged sequentially in order of increasing proximity to a light beam incidence side, in the step of partially initializing the region of the recording film of at least the n-th information layer through use of the first light beam, the first light beam is used for partially initializing the initialization region for focus adjustment except the recording and reproducing region in the recording film, and in the step of irradiating the information recording medium with the second light beam, the initialization region for focus adjustment, which is subjected to the partial initialization, is irradiated with the second light beam.

An initialization method for an information recording medium according to a fifth aspect of the present invention may be configured as follows. That is, in the fourth aspect, in the step of partially initializing the region of the recording film of the N-th information layer through use of the first light beam, the first light beam is used for partially initializing the initialization region for focus adjustment except the recording and reproducing region in the recording film, and in the step of irradiating the information recording medium with the second light beam, the initialization region for focus adjustment, which is subjected to the partial initialization, is irradiated with the second light beam.

An initialization method for an information recording medium according to a sixth aspect of the present invention may be configured as follows. That is, in the third aspect, in the step of partially initializing the initialization region for focus adjustment, all the recording films of the N information layers are partially initialized in such a manner that the focus position of the first light beam is reciprocated in a thickness direction of the information recording medium.

An initialization method for an information recording medium according to a seventh aspect of the present invention may be configured as follows. That is, in the second aspect, in a case where the focus position of the first light beam is reciprocated in a thickness direction of the information recording medium in the step of partially initializing the initialization region for focus adjustment, a power of the first light beam in a forward operation direction is different from a power of the first light beam in a backward operation direction at the focus position of the first light beam.

An initialization method for an information recording medium according to an eighth aspect of the present invention may be configured as follows. That is, in the seventh aspect, in the case where the focus position of the first light beam is reciprocated in the thickness direction of the information recording medium in the step of partially initializing the initialization region for focus adjustment, a power of the first light beam which approaches the light beam incidence side of the information recording medium is larger than a power of the first light beam which moves away from the light beam incidence side of the information recording medium.

An initialization method for an information recording medium according to a ninth aspect of the present invention may be configured as follows. That is, in the first aspect, the wavelength of the first light beam falls within a range from 630 to 850 nm.

An initialization method for an information recording medium according to a tenth aspect of the present invention may be configured as follows. That is, in the first aspect, the wavelength of the second light beam falls within a range of ±60 nm with respect to the wavelength for recording and reproducing information on and from the information recording medium.

An initialization method for an information recording medium according to an eleventh aspect of the present invention may be configured as follows. That is, in the first aspect, the wavelength of the second light beam falls within a range of ±20 nm with respect to the wavelength for recording and reproducing information on and from the information recording medium.

An initialization method for an information recording medium according to a twelfth aspect of the present invention may be configured as follows. That is, in the first aspect, the second light beam is smaller in spot size than the first light beam.

An initialization method for an information recording medium according to a thirteenth aspect of the present invention may be configured as follows. That is, in the first aspect, the second light beam has a spot position located backward of a spot position of the first light beam with respect to an initialization proceeding direction.

An initialization method for an information recording medium according to a fourteenth aspect of the present invention may be configured as follows. That is, in the first aspect, in a step of aligning the focus position of the first light beam with a position of the recording film, the focus position is controlled through use of the second light beam, based on the focus error signal generated from the light reflected from the recording film, and then is controlled through use of the first light beam switched from the second light beam.

An initialization method for an information recording medium according to a fifteenth aspect of the present invention may be configured as follows. That is, in the fourteenth aspect, upon execution of the initialization of the recording film through use of the first light beam, the recording film is not irradiated with the second light beam.

An information recording medium according to a sixteenth aspect of the present invention is an information recording medium including at least two or more information layers. Herein, the information layer includes a recording film in which an initialization region for focus adjustment is formed as a region except a recording and reproducing region, and the initialization region for focus adjustment is partially initialized using a first light beam having a wavelength for initialization and is irradiated with a second light beam having a wavelength corresponding to a wavelength for recording and reproducing information on and from the information recording medium, and a focus position is adjusted based on a focus error signal generated from light reflected from the information layer, so that the recording film is initialized using the first light beam having the focus position adjusted. In the information recording medium configured as described above, the recording films of all the information layers are securely initialized. Thus, it is possible to provide a highly reliable recording medium.

An information recording medium according to a seventeenth aspect of the present invention may be configured as follows. That is, in the sixteenth aspect, in the recording film irradiated with the second light beam, a reflectivity in an initialized state is higher than a reflectivity in an uninitialized state. In the information recording medium according to the seventeenth aspect, therefore, the information recording medium is irradiated with the second light beam, so that the reflected light from the initialized recording film is generated securely, which leads to enhancement of the level of the focus error signal.

An information recording medium according to an eighteenth aspect of the present invention may be configured as follows. That is, in the sixteenth aspect, a distance between the information layers is equal to or less than 30% μm. In the information recording medium according to the eighteenth aspect, therefore, the initialization method and the initialization apparatus according to the present invention allow secure initialization processing which is very difficult to be realized by the conventional initialization method.

An initialization apparatus for an information recording medium according to a nineteenth aspect of the present invention is an initialization apparatus for initializing a recording film of an information recording medium. The initialization apparatus includes at least one optical head for irradiating the recording film with a light beam. Herein, the optical head includes: a first light source for emitting a first light beam having a wavelength for initialization; a second light source for emitting a second light beam having a wavelength corresponding to a wavelength for recording and reproducing information on and from the information recording medium; an objective lens for concentrating the first light beam and the second light beam onto the recording film; and a focus position control part for controlling a focus position of at least one of the light beams. The initialization apparatus configured as described above allows stable and secure initialization of the recording films of all the information layers of the multilayer information recording medium.

An initialization apparatus according to a twentieth aspect of the present invention may be configured as follows. That is, in the nineteenth aspect, the initialization apparatus further includes a mechanism for shifting the objective lens for concentrating the light beam onto the recording film, in a thickness direction of the information recording medium.

An initialization apparatus for an information recording medium according to a twenty-first aspect of the present invention may be configured as follows. That is, in the nineteenth aspect, the wavelength of the first light beam falls within a range from 630 to 850 nm.

An initialization apparatus for an information recording medium according to a twenty-second aspect of the present invention may be configured as follows. That is, in the nineteenth aspect, the wavelength of the second light beam falls within a range of ±60 nm with respect to the wavelength for recording and reproducing the information on and from the information recording medium.

An initialization apparatus for an information recording medium according to a twenty-third aspect of the present invention may be configured as follows. That is, in the nineteenth aspect, the second light beam is smaller in spot size than the first light beam.

An initialization apparatus for an information recording medium according to a twenty-fourth aspect of the present invention may be configured as follows. That is, in the nineteenth aspect, the second light beam has a spot position located backward of a spot position of the first light beam with respect to an initialization proceeding direction.

An initialization apparatus for an information recording medium according to a twenty-fifth aspect of the present invention may be configured as follows. That is, in the nineteenth aspect, the focus position control part is configured to control the focus position of the first light beam and the focus position of the second light beam.

An initialization apparatus for an information recording medium according to a twenty-sixth aspect of the present invention may be configured as follows. That is, in the nineteenth aspect, the objective lens has a numerical aperture NA which is equal to or more than 0.6.

Effects of the Invention

The initialization method and the initialization apparatus for the information recording medium according to the present invention allow stable and secure focus adjustment to be performed on a multilayer information recording medium including a plurality of information layers, secure initialization of all the information layers, and remarkable improvement of a manufacturing yield. Thus, it is possible to reduce manufacturing costs and therefore provide an inexpensive information recording medium.

BRIEF DESCRIPTION OF THE DRAWINGS

FIG. 5C is a diagram showing one example of a focus error signal in an experiment;

FIG. 5D is a diagram showing one example of a focus error signal in an experiment;

FIG. 5E is a diagram showing one example of a focus error signal in an experiment;

MODES FOR CARRYING OUT THE INVENTION

Hereinafter, referring to the accompanying drawings, an initialization method for an information recording medium according to preferred embodiments of the present invention, an initialization apparatus, and an information recording medium manufactured by the initialization method are described.

First, a description of experimental results of initialization processing based on a conception of the initialization method of the information recording medium of the present invention is given.

As shown in FIGS. 11A to 11E each described above, in the focus adjustment when the light beam with a wavelength of 810 nm is used to the multilayer information recording medium including the four information layers (recording films), the amounts of reflected light from the respective recording films are small, so that the secure focus adjustment to the respective recording films by the focus error signal is very difficult.

Figure 10:
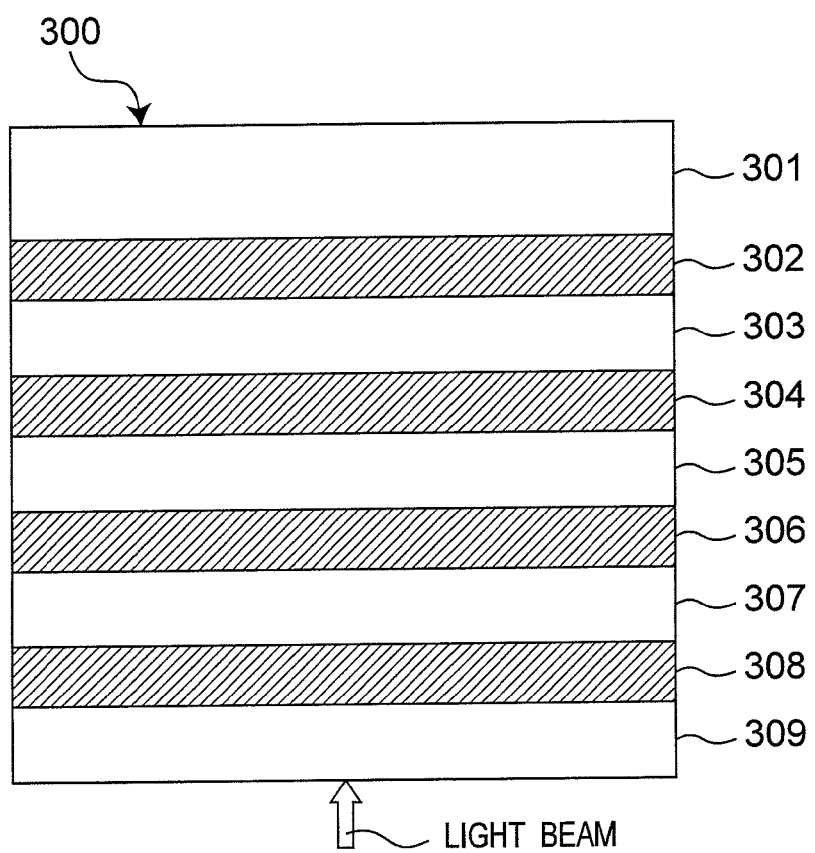
FIG. 10 is a section diagram showing a schematic configuration of a multilayer information recording medium including four information layers.
Figure 11A:
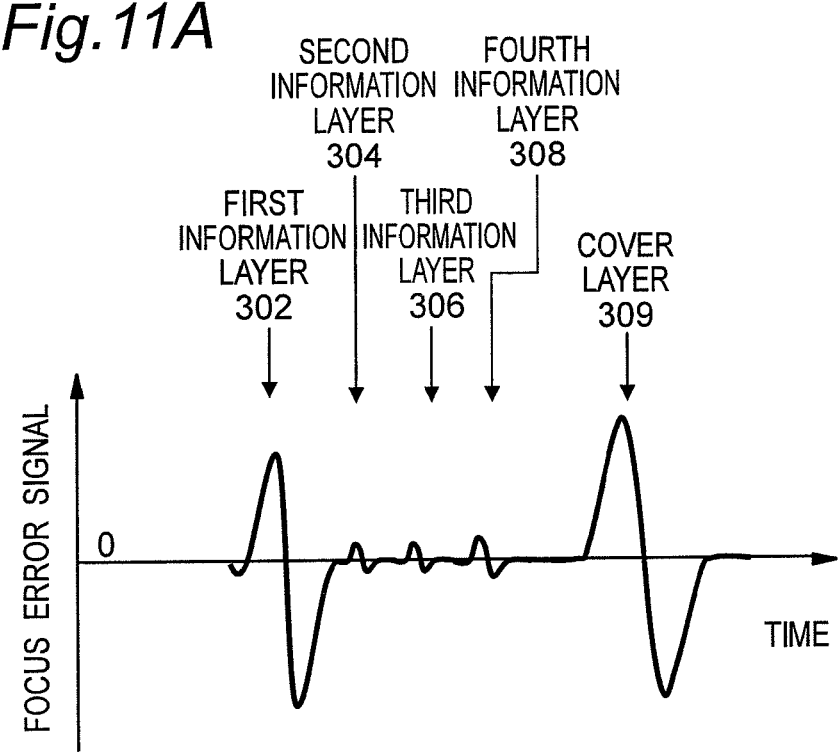
FIG. 11A is a diagram showing one example of a focus error signal in an experiment.
Figure 11B:
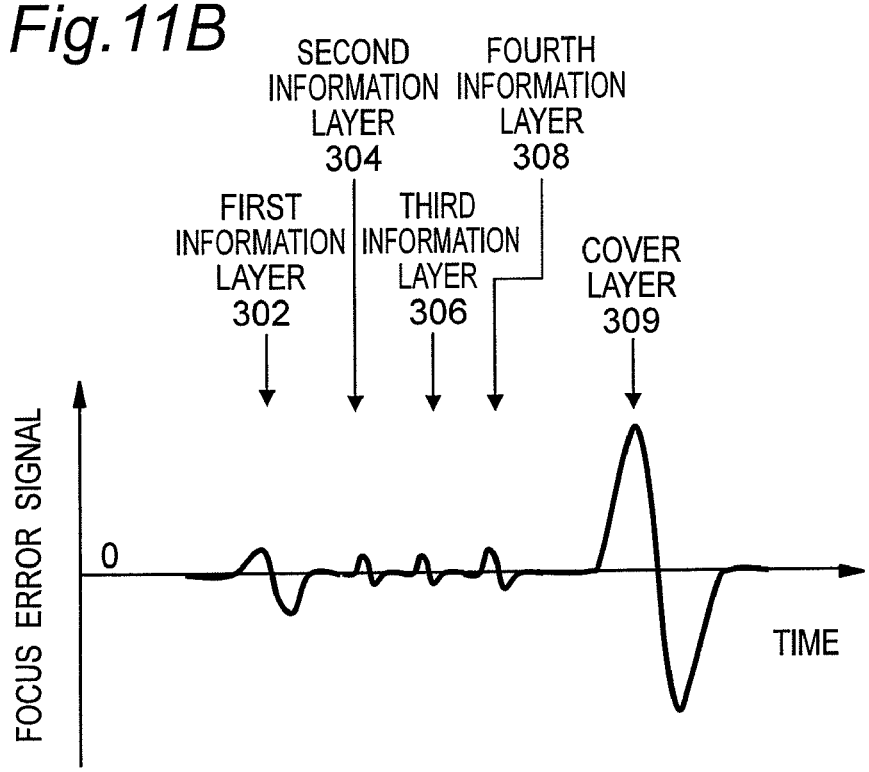
FIG. 11B is a diagram showing one example of a focus error signal in an experiment.
Figure 11C:
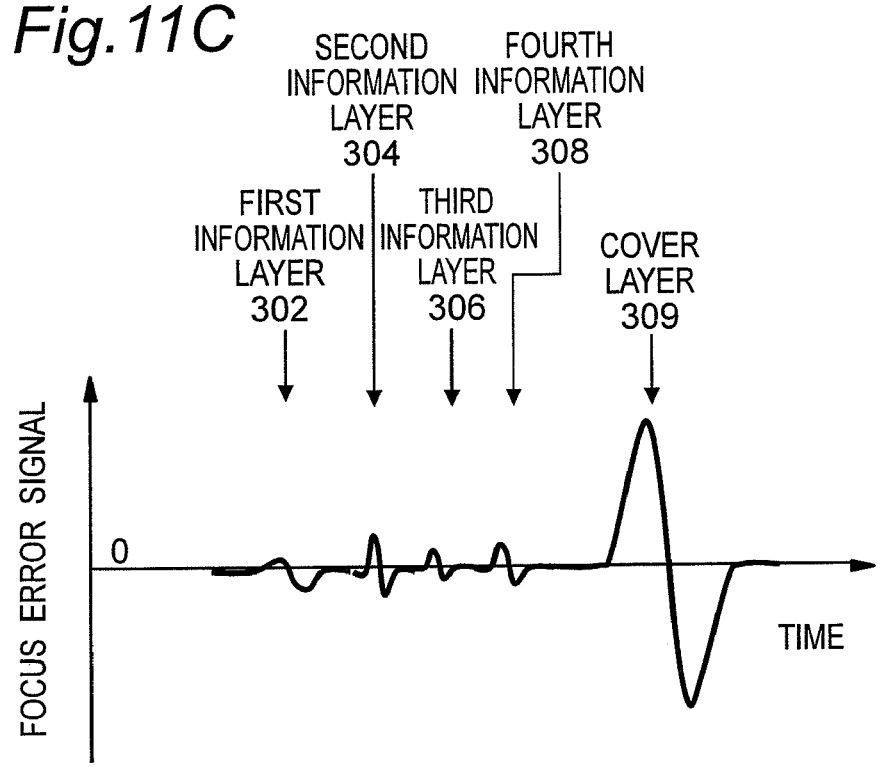
FIG. 11C is a diagram showing one example of a focus error signal in an experiment.
Figure 11D:
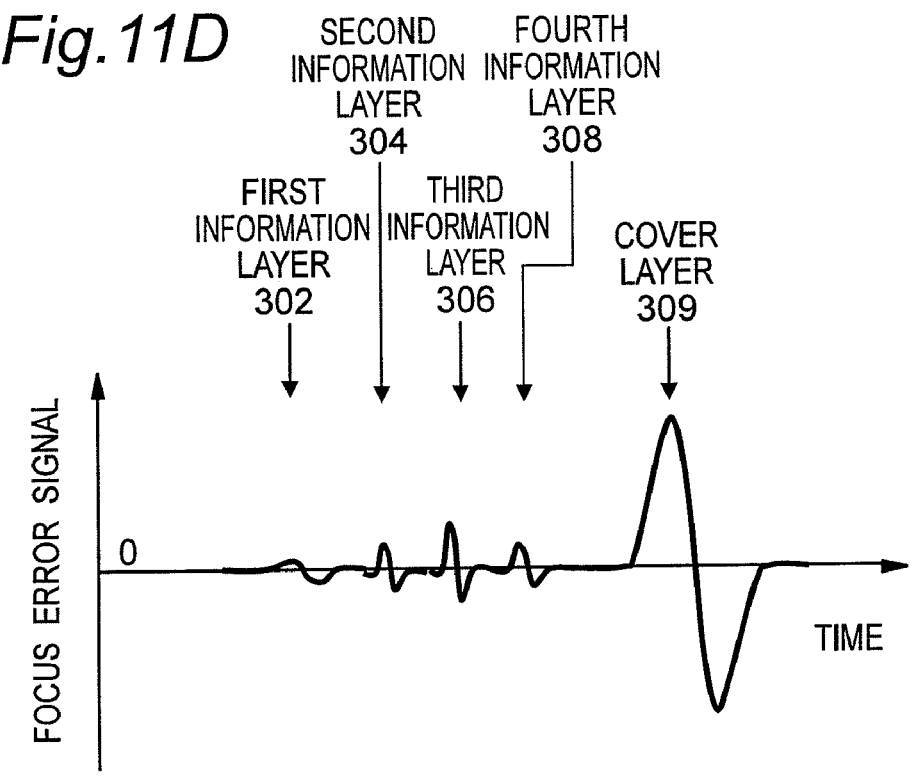
FIG. 11D is a diagram showing one example of a focus error signal in an experiment.
Figure 11E:
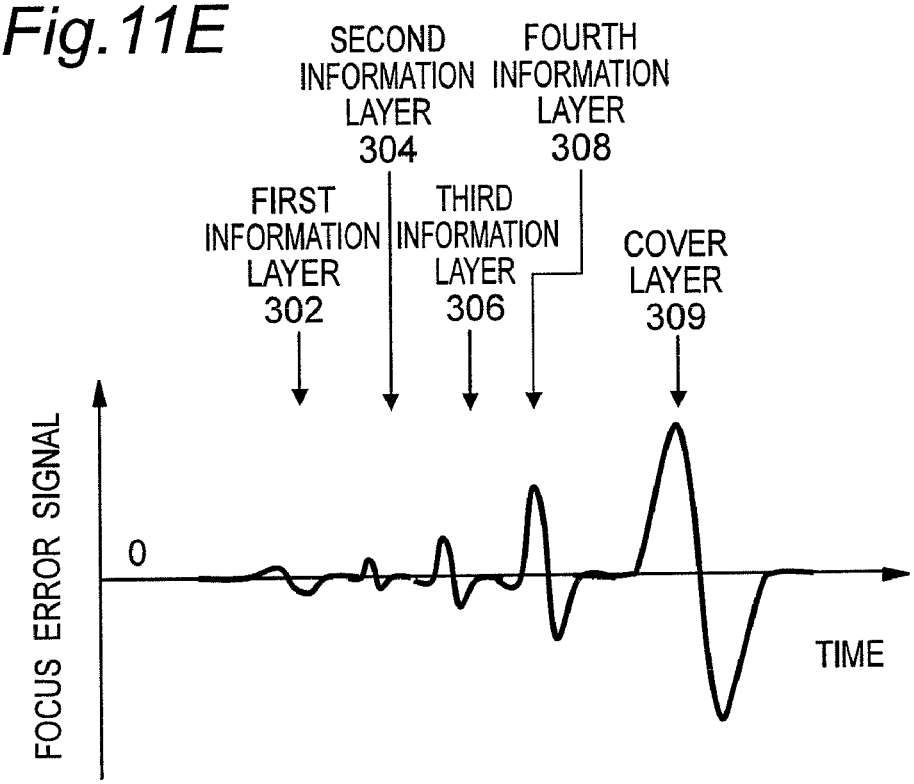
FIG. 11E is a diagram showing one example of a focus error signal in an experiment.

Consequently, the present inventor conceives that in the focus adjustment in the initialization processing to the multilayer information recording medium, the focus adjustment is performed using a light beam for use in recording and reproduction of the information recording medium to be initialized, and based on the conception, initialization processing experiments described below were conducted, and the initialization method and the initialization apparatus of the present invention were realized. In the initialization processing experiments described below, the initialization apparatus described in Embodiment 1 described later was used, and a multilayer information recording medium including the four information layers (refer to FIG. 10) was used as the information recording medium to be initialized. The wavelength of the light beam for recording and reproduction of this multilayer information recording medium is 405 nm.

FIGS. 5A to 5E show initialization processing experimental results, and show a focus error signal when the multilayer information recording medium is irradiated with light beam of a wavelength 405 nm.

Figure 5A:
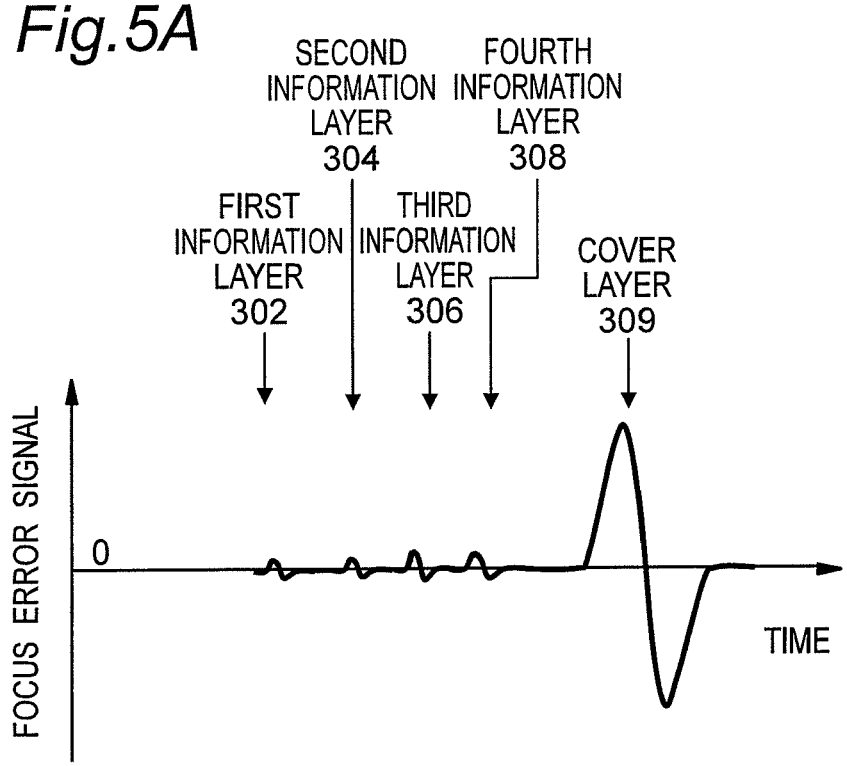
FIG. 5A is a diagram showing one example of a focus error signal in an experiment.

FIG. 5A shows the focus error signal detected in a state before all information layers 302, 304, 306, 308 are initialized. As shown in FIG. 5A, the amounts of reflected light from all the information layers in the multilayer information recording medium 100 were small, and a level of the focus error signal in the respective information layers was low.

Figure 5B:
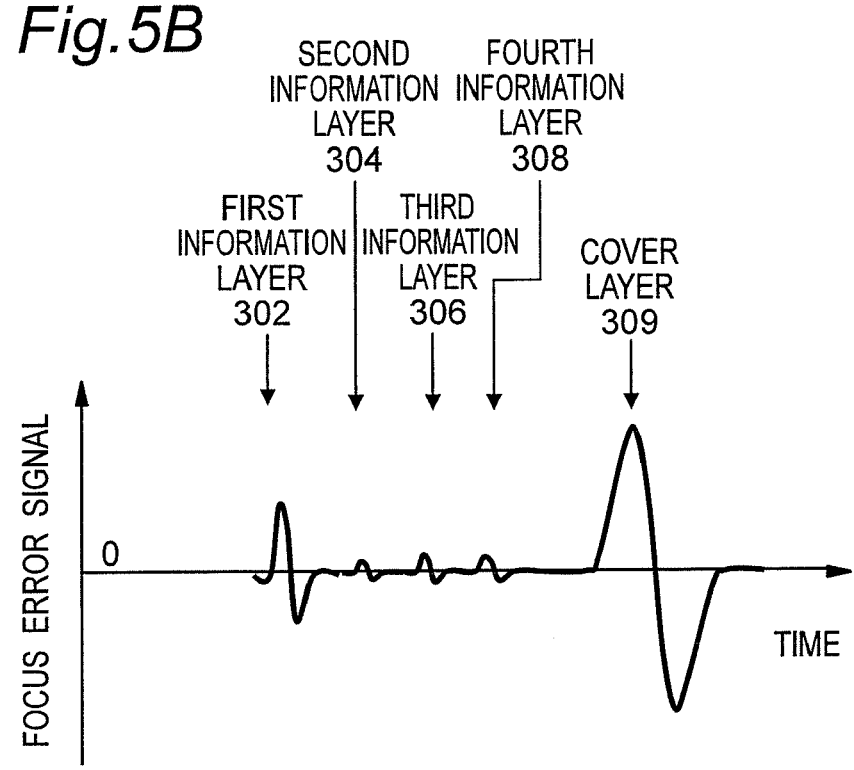
FIG. 5B is a diagram showing one example of a focus error signal in an experiment.

FIG. 5B shows the focus error signal after the first information layer 302 is partially initialized (an initialization region for focus adjustment described later is partially initialized). The focus error signal shown in FIG. 5B is the focus error signal when the region other than a region where data is recorded and reproduced (the initialization region for focus adjustment) in the first information layer 302 is partially initialized, and the initialized portion is irradiated with the light beam. Accordingly, regions in the first information layer 302, the second information layer 304, the third information layer 306 and the fourth information layer 308 to be subjected to recording and reproduction (data recording and reproducing regions) are in an uninitialized state.

As shown in FIG. 5B, the amount of reflected light from the first information layer 302 is securely detected, and the level of the focus error signal in the first information layer 302 became high. Accordingly, it is easy to focus on the position of the recording film of the first information layer 302.

FIG. 5C shows the focus error signal after the first information layer 302 and the second information layer 304 are partially initialized. The focus error signal shown in FIG. 5C is the focus error signal when the regions other than the regions where data is recorded and reproduced (the initialization regions for focus adjustment) in the first information layer 302 and the second information layer 304 are partially initialized, and the initialized portions are irradiated with the light beam. Accordingly, the regions in the first information layer 302, the second information layer 304, the third information layer 306 and the fourth information layer 308 to be subjected to recording and reproduction (data recording and reproducing regions) are in the uninitialized state. As shown in FIG. 5C, the amounts of reflected light from the first information layer 302 and the second information layer 304 are securely detected, and the level of the focus error signal in the first information layer 302 and the second information layer 304 is high. Accordingly, it is easy to focus on the positions of the recording films of the first information layer 302 and the second information layer 304.

FIG. 5D shows the focus error signal after the first information layer 302, the second information layer 304, and the third information layer 306 are partially initialized. The focus error signal shown in FIG. 5D is the focus error signal when the regions other than the regions where data is recorded and reproduced (the initialization regions for focus adjustment) in the first information layer 302, the second information layer 304 and the third information layer 306 are partially initialized, and the initialized portions are irradiated with the light beam. Accordingly, the regions in the first information layer 302, the second information layer 304, the third information layer 306 and the fourth information layer 308 to be subjected to recording and reproduction (data recording and reproducing regions) are in the uninitialized state. As shown in FIG. 5D, the amounts of reflected light from the first information layer 302, the second information layer 304, and the third information layer 306 are securely detected, and the level of the focus error signal in the first information layer 302, the second information layer 304, and the third information layer 306 is high. Accordingly, it is easy to focus on the positions of the recording films of the first information layer 302 and the second information layer 304, and further the third information layer 306.

FIG. 5E shows the focus error signal after the first information layer 302, the second information layer 304, the third information layer 306 and the fourth information layer 308 are partially initialized. The focus error signal shown in FIG. 5E is the focus error signal when the regions other than the regions where data is recorded and reproduced (the initialization regions for focus adjustment) in the first information layer 302, the second information layer 304, the third information layer 306, and the fourth information layer 306 are partially initialized, and the initialized portions are irradiated with the light beam. Accordingly, the regions in the first information layer 302, the second information layer 304, the third information layer 306 and the fourth information layer 308 to be subjected to recording and reproduction (data recording and reproducing regions) are in the uninitialized state. As shown in FIG. 5E, the amounts of reflected light from the first information layer 302, the second information layer 304, the third information layer 306, and the fourth information layer 308 are securely detected, and the level of the focus error signal in the first information layer 302, the second information layer 304, the third information layer 306, and the fourth information layer 308 is high. Accordingly, it is easy to focus on the positions of the recording films of the first information layer 302, the second information layer 304, and the third information layer 306, and further the fourth information layer 308.

As described above, when the focus adjustment is performed to the multilayer information recording medium, by irradiating the multilayer information recording medium with the light beam for recording and reproduction, the amounts of reflected light from the respective information layers are made larger, and the focus error signal at the high level in the respective information layers. Accordingly, it has been confirmed from the initialization processing experiments by the present inventor that the portions of the respective information layers to be subjected to the initialization processing are initialized, and the light beam for recording and reproduction is used by the focus adjustment, which makes it easy to focus the light beam for initialization on the positions of the respective information layers, and allows it to be securely performed.

The present invention realizes an initialization method and an initialization apparatus for an information recording medium, based on the above-described initialization processing experimental results.

Embodiment 1

Hereinafter, an initialization method and an initialization apparatus according to Embodiment 1 of the present invention will be described.

Figure 1:
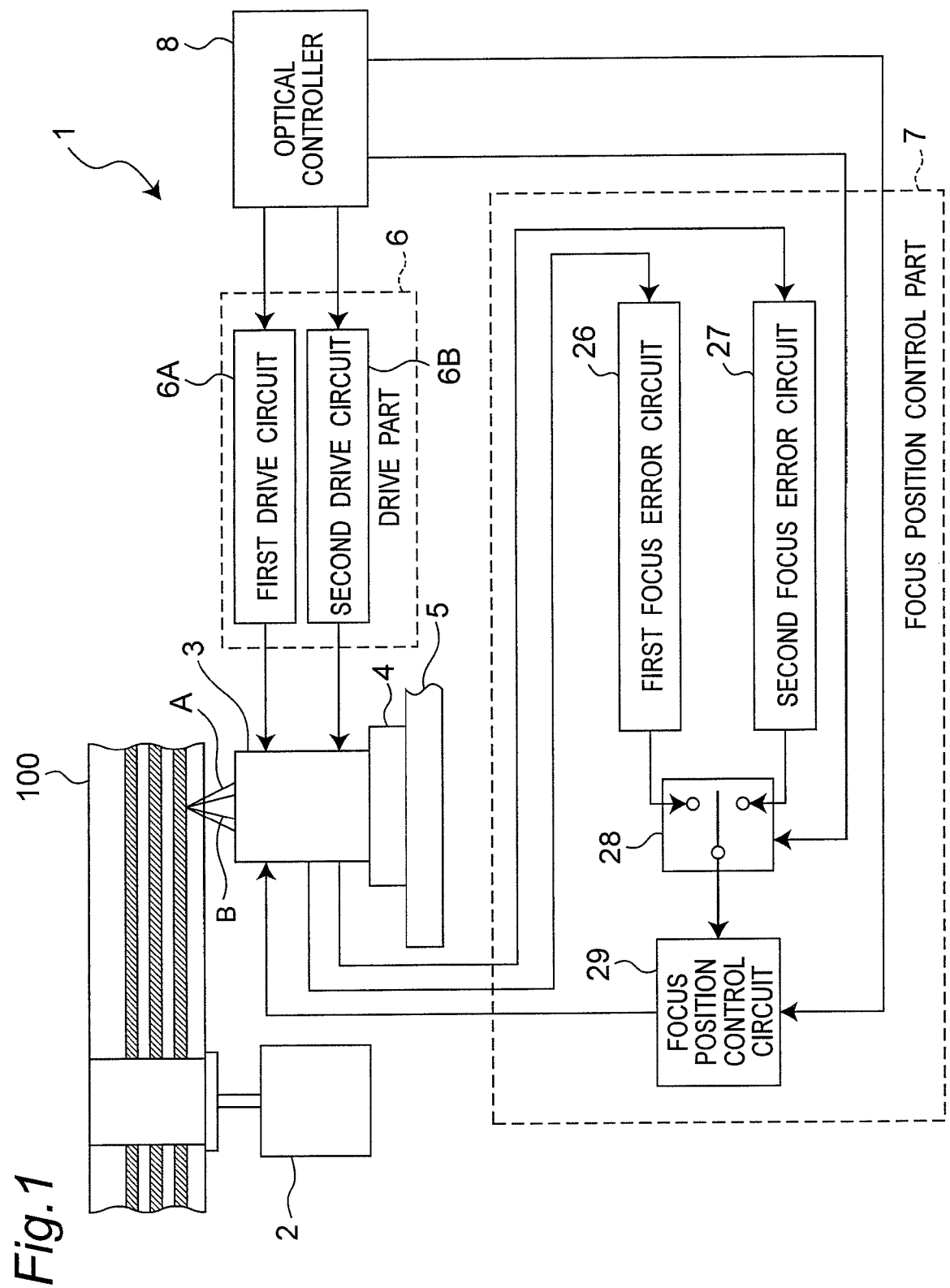
FIG. 1 is a block diagram showing a schematic configuration of an initialization apparatus for an information recording medium according to Embodiment 1 of the present invention.
Figure 2:
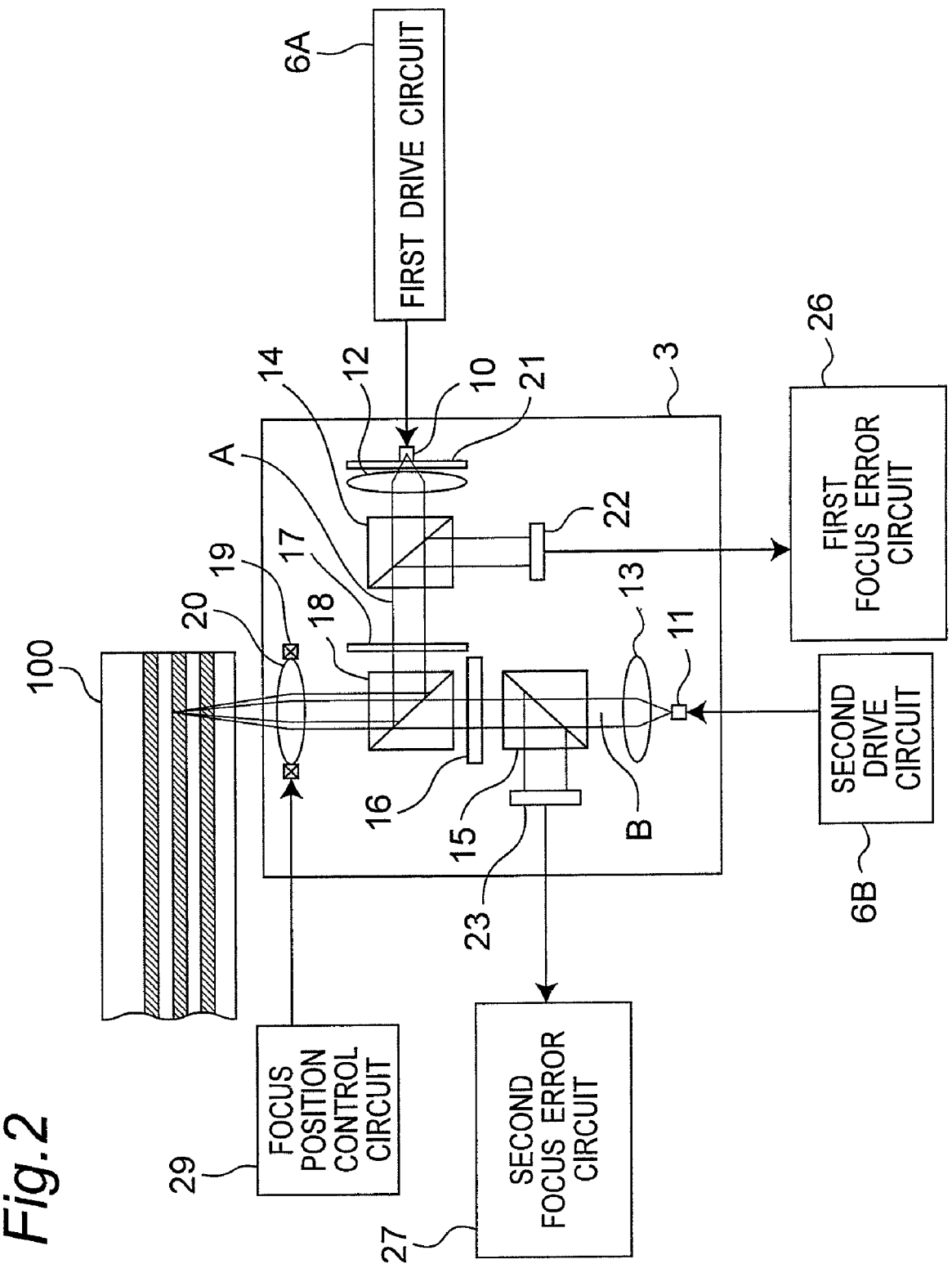
FIG. 2 is a diagram showing a configuration of an optical head in the initialization apparatus for the information recording medium according to Embodiment 1.

FIG. 1 is a block diagram showing a schematic configuration of the initialization apparatus according to Embodiment 1 of the present invention. FIG. 2 is a diagram showing a configuration of an optical head in the initialization apparatus according to Embodiment 1.

In FIG. 1, the initialization apparatus 1 according to Embodiment 1 is configured to include a spindle motor 2 that rotatably drives the multilayer information recording medium 100 including three or more information layers, an optical head 3 having a plurality of light sources, a transfer table 4 on which the optical head 3 is placed, a movement means 5 for moving the transfer table 4 to a predetermine position, a drive part 6 for driving the light sources in the optical head 3, a focus position control part 7 that controls the focus of a light beam of the optical head 3, and an optical controller 8 that controls the drive part 6 and the focus position control part 7.

The drive part 6 has a first drive circuit 6A that drives a first light source 10 (refer to FIG. 2) in the optical head 3, and a second drive circuit 6B that drives a second light source 11 (refer to FIG. 2) in the optical head 3, and the respective drive circuits 6A, 6B are controlled by the optical controller 8.

The focus position control part 7 is configured to have a first focus error circuit 26 that forms a focus error signal by the first light source 10 in the optical head 3, a second focus error circuit 27 that forms a focus error signal by the second light source 11 in the optical head 3, a switching circuit 28, and a focus-position control circuit 29 that adjusts a position of an objective lens in the optical head 3.

[Configuration of Optical Head]

Next, a detailed structure of the optical head 3 is described. As shown in FIG. 2, the optical head 3 in the initialization apparatus 1 according to Embodiment 1, the two light sources 10, 11 are provided.

As the first light source 10 in the optical head 3 is used a semiconductor laser having a large spot size and a high output in order to conduct the initialization of a large area in the multilayer information recording medium, and for example, a semiconductor laser that emits a light beam with a wavelength in a range of 630 to 850 nm is used. In the initialization apparatus 1 according to Embodiment 1, the semiconductor laser with a wavelength of 810 nm is used. Moreover, as the second light source 11 in the optical head 3 is used a semiconductor laser that emits a light beam with a wavelength corresponding to a wavelength at which recording and reproduction of information is performed to the multilayer information recording medium 100. For example, when in the multilayer information recording medium 100, the wavelength of the light beam that performs the recording and reproduction is 405 nm, the light beam preferably has a wavelength in a range of 345 nm to 465 nm whose reflective ratio from each the information layers (recording films) after the initialization of the multilayer information recording medium 100 exhibits a sufficient values for the focus adjustment. That is, the wavelength preferable for the second light source 11 is 405±60 nm. More preferably, the light beam is a light beam with a wavelength of 405±20 nm, and since the use of this light beam allows the focus error signal from the respective information layers (recording films) to securely appear, the focus adjustment to the recording films of the respective information layers can be performed securely and at high precision. This is because in the multilayer information recording medium, setting is made so as to perform recording and reproduction using the light beam of the wavelength of 405 nm. Accordingly, at least irradiating the multilayer information recording medium with the light beam with the wavelength of 405±60 nm allows the focus adjustment to be securely performed.

To the first light source 10 in the optical head 3, current/voltage control is performed by the first drive circuit 6A of the drive part 6. Moreover, to the second light source 11, current/voltage control is performed by the second drive circuit 6B of the drive part 6.

In the optical head 3 shown in FIG. 2, a wavelength selective mirror 18 reflects a first light beam A emitted from the first light source 10, and transmits a second light beam B emitted from the second light source 11. The second light beam B emitted from the second light source 11 passes through a collimator lens 13, a beam splitter 15, a quarter wavelength plate 16, and goes through the wavelength selective mirror 18 to be collected on the predetermined information layer (recording layer) of the multilayer information recording medium 100 through an objective lens 20.

The second light beam B reflected in the information layer again passes through the objective lens 20, goes through the wavelength selective mirror 18, and passes through the quarter wavelength plate 16, and is reflected in the beam splitter 15 to enter a second focus error detector 23. The reflected light of the second light beam B entering the second focus error detector 23 is converted into the focus error signal in the second focus error circuit 27. The focus error signal is inputted to the focus-position control circuit 29 through the switching circuit 28.

The focus-position control circuit 29 forms a control signal based on the inputted focus error signal to control a voice coil 19. The voice coil 19 is driven by the control signal from the focus-position control circuit 29 to adjust a position of the objective lens 20, which allows the second light beam B to be focused on a position of the recording film of the information layer specified in the multilayer information recording medium 100.

On the other hand, the first light beam A emitted from the first light source 10 passes through a light-path correcting part 21 made of a liquid crystal element, a collimator lens 12, a beam splitter 14, a quarter wavelength plate 17, and is reflected in the wavelength selective mirror 18. The first light beam A reflected in the wavelength selective mirror 18 is collected on the predetermined information layer (recording film) of the multilayer information recording medium 100 through the objective lens 20, so that the initialization of the information layer of interest is conducted.

In the initialization processing, the first light beam A reflected from the information layer again passes through the objective lens 20, is reflected in the wavelength selective mirror 18, and passes through the quarter wavelength plate 17, and is reflected in the beam splitter 14 to enter a first focus error detector 22. The reflected light of the first light beam A entering the first focus error detector 22 is converted into the focus error signal in the first focus error circuit 26.

In the switching circuit 28 of the focus position control part 7, when the switchover is set so that the focus error signal from the first focus error circuit 26 is inputted to the focus-position control circuit 29 (during operation of the initialization processing), the focus error signal is inputted to the focus-position control circuit 29 through the switching circuit 28. The position of the objective lens 20 can be adjusted by the voice coil 19 in accordance with the control signal outputted from the focus position control circuit 29, and in addition, an optical path can be corrected by the optical-path correcting part 21.

As described above, the switchover of the switching circuit 28 is controlled by the optical controller 8 so that either of the focus error signal from the first focus error circuit 26, and the focus error signal from the second focus error circuit 27 is inputted to the focus-position control circuit 29.

The optical controller 8 performs drive control of the spindle motor 2, the movement means 5, the drive part 6, the focus position control part 7 and the like. For example, the optical controller 8 performs control over the overall initialization operation such as drive control of the spindle motor 2, intensity setting control of the first light beam A and the second light beam B, drive control for partial initialization in which the first light beam A is relatively reciprocated (vertically moved) with respect to the information recording medium 100 in a thickness direction thereof, and switching control of the switching circuit 28.

The focus-position control circuit 29 operates the voice coil 19 based on the focus error signal inputted through the switching circuit 28 to control the focus position of the objective lens 20 on the position of the recording film of the specific information layer. In Embodiment 1, at a stage before the initialization processing, the focus adjustment of the objective lens 20 is performed based on the focus error signal by the second light beam B after partial initialization by the first light beam A. During the initialization processing after the focus adjustment, while the focus adjustment by the second light beam B is basically performed as needed, in the case of the specific information layer, the focus adjustment of the objective lens 20 may be performed based on the focus error signal by the first light beam A. In this case, when the focus error signal by the first light beam A becomes smaller than a predetermined value during the initialization processing, the switching control may be performed by the switching circuit 28 to perform the focus adjustment by the second light beam B, and then, the initialization processing by the first light beam A may be performed.

A numerical aperture NA of the objective lens 20 is arbitrarily designed in accordance with optical properties of the recording film of the information layer to be initialized in the multilayer information recording medium 100, a thickness of a substrate and the like. However, for example, in the multilayer information recording medium including three layers, a thickness of a transparent separation layer formed between the information layers is 30 μm or less, and thus, in order to increase separation of the focus error signal, a higher numerical aperture NA is advantageous, and it is preferable that a relation of NA≧0.6 is satisfied. Moreover, the focus adjustment can be performed by a general adjustment method such as a knife-edge method and an astigmatic method.

In the initialization processing operation, the predetermined recording film of the multilayer information recording medium 100 is irradiated with the first light beam A having a large power from the objective lens 20.

A spot shape in the focus position of the first beam A is set to be an oval having lengths of 30 to 200 µm in a radial direction of the multilayer information recording medium 100, and 1 to 5 µm in a circumferential direction. Accordingly, a wide range of the information layer of the multilayer information recording medium 100 can be initialized by the first light beam A.

While the case where the optical-path correction part 21 that corrects the optical path of the first light beam A from the first light source 10 is made of the liquid crystal element has been described, any means that can adjust the optical path can be used, and for example, it may be made of a lens with a movable mechanism by a piezoelectric element or the like. Moreover, a setting place of the optical-path correction part 21 may be between the collimator lens 12 and the beam splitter 14.

Figure 3:
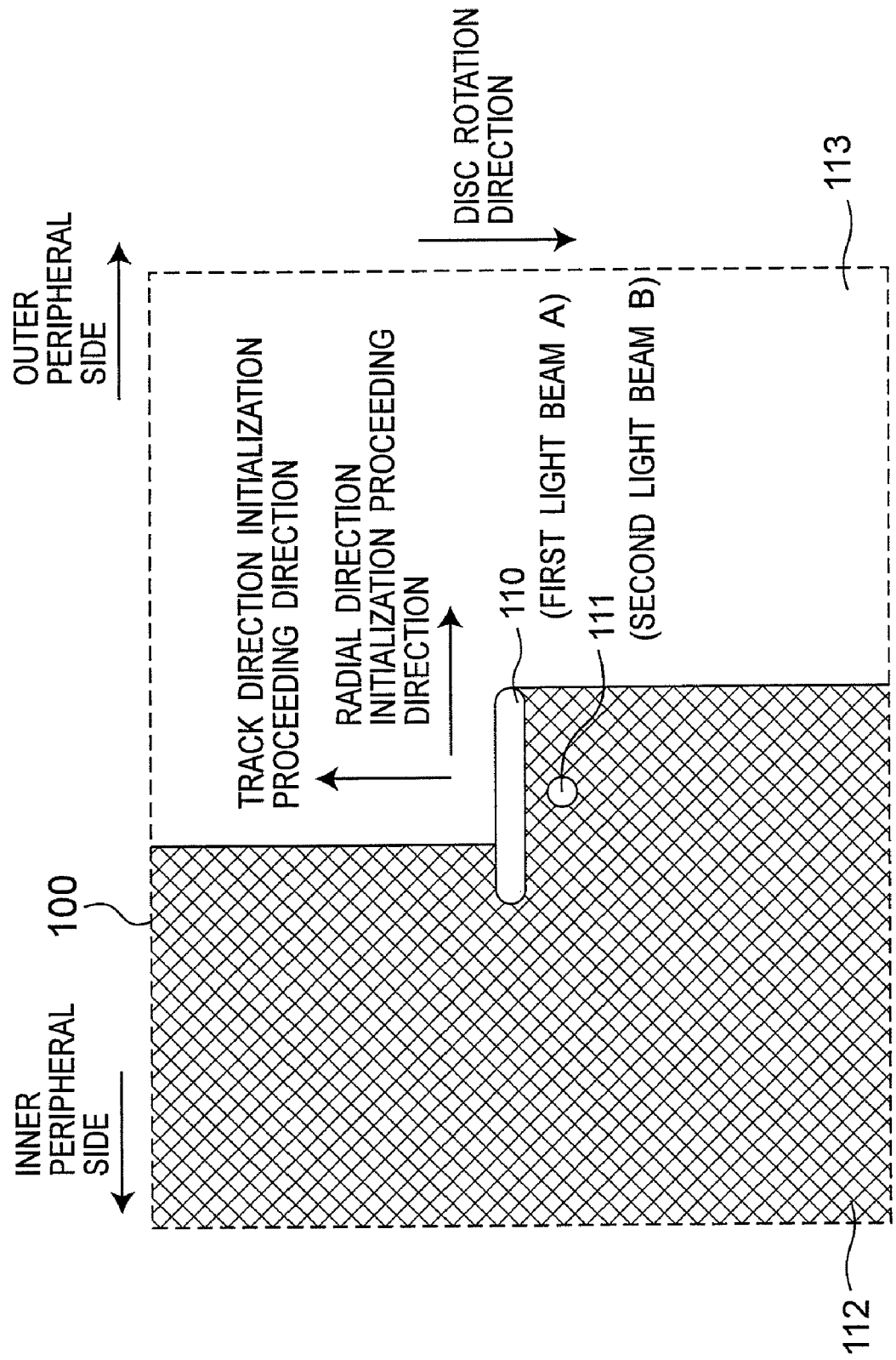
FIG. 3 is a diagram showing a relation among a spot shape of a first light beam, a spot shape of a second light beam, a spot position of the first light beam, and a spot position of the second light beam in the information recording medium, in the initialization apparatus for the information recording medium according to Embodiment 1.

FIG. 3 is a partially enlarged diagram conceptually showing positions where optical spots of the first light beam A and the second light beam. B are irradiated to the multilayer information recording medium 100, spot sizes, and an initiated region and an uninitiated region of the recording film of the information layer in the multilayer information recording medium 100. In FIG. 3, a cross-hatching portion is an initialized region 112 that has been initialized by the first light beam A, and a white region is an uninitialized region 113.

In the first light beam A and the second light beam B, here, focus positions in a film thick direction in the information layer are the same (a misalignment amount is up to 50 nm). Moreover, as to the focus positions inside an information layer surface, as shown in FIG. 3, a beam spot 111 of the second light beam B is set to be at the back of the beam spot 110 of the first light beam A with respect to an initialization proceeding direction in a track direction. Furthermore, as shown in FIG. 3, the spot size of the second light beam B is set to be smaller than the spot size of the first light beam A. This enables the focus adjustment in the initialization apparatus according to Embodiment 1 based on the focus error signal by the second light beam B in the region where the partial initialization has been completed by the first light beam A.

[Configuration of Multilayer Information Recording Medium]

Figure 4:
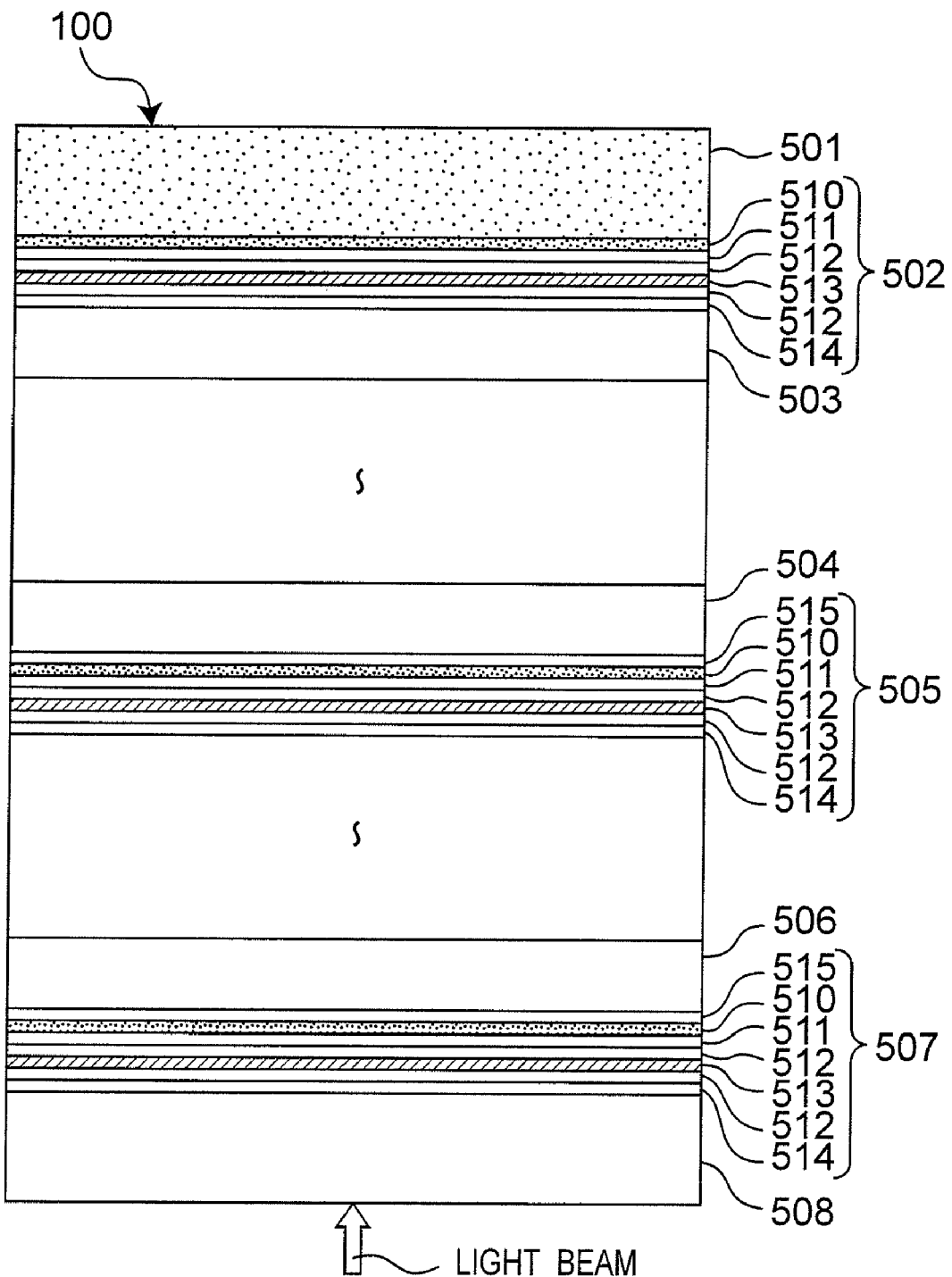
FIG. 4 is a section diagram showing one example of an information recording medium used in the initialization apparatus for the information recording medium according to Embodiment 1.

FIG. 4 is a section diagram showing a cross sectional configuration of the multilayer information recording medium 100 initialized by the initialization apparatus 1 according to Embodiment 1.

As shown in FIG. 4, in the multilayer information recording medium 100, there are formed information layers of N layers from a first information layer 502 to an N-th information layer (N is a positive integer of three or more) formed on a substrate 501, and transparent separation layers 503, 504, 506 are formed between the information layers. Moreover, a cover layer 508 is formed on the last N-th information layer 507 (on a lower side in FIG. 4). Here, an n-th information layer 5-5 (n is an integer, and 2≦n<N) is described as an intermediate information layer formed between the first information layer 502 and the N-th information layer 507.

In the first information layer 502, a reflective film 510, a second dielectric film 511, an interface film 512, a recording film 513, an interface film 512 and a first dielectric film 514 are laminated and formed in this order on the substrate 501. In the n-th information layer 505 as the intermediate information layer, a transmissivity adjustment film 515, the reflective layer 510, the second dielectric film 511, the interface film 512, the recording film 513, the interface film 512, and the first dielectric film 514 are laminated and formed in order from the substrate 501 side. In the N-th information layer 507 as the last information layer at a farthest position from the substrate 501, as in the n-th information layer 505, the transmissivity adjustment film 515, the reflective layer 510, the second dielectric film 511, the interface film 512, the recording film 513, the interface film 512, and the first dielectric film 514 are laminated and formed in order from the substrate 501 side.

While an example in which in the first information layer 502, the n-th information layer 505, and the N-th information layer 507, the interface films 512 are provided is described, they may not be provided when recording and reproduction performance and weatherability are not deteriorated even if the first dielectric 514 and the second dielectric 511 are indirect contact with the recording film 513, depending on the specification of the multilayer information recording medium.

The substrate 501 in the multilayer information recording medium 100 is a disk-like transparent substrate, and as a material of the substrate 501, for example, resin such as polycarbonate, amorphous polyolefin, and polymethylmethacrylate (PMMA), or glass can be used. In the substrate 501, a guide groove (with a track pitch 0.32 µm) for guiding the light beam as the laser beam may be formed in a surface on the first information layer side as need. As the substrate 501, a substrate having a thickness of 500 µm to 1300 µm) is used.

The transparent separation layers 503, 504, 506 in the multilayer information recording medium 100 shown in FIG. 4, for example, are formed using, as a material, resin such as light curable resin (particularly, ultraviolet curable resin is preferable) and slow-acting heat curable resin. The transparent separation layers 503, 504, 506 are formed by applying the above-described resin onto the respective information layers and subjecting the resultant to spin coating, and then curing the resin. When the guide groove is formed in the transparent separation layers 503, 504, 506, a substrate for transcription (mold) with a groove in a predetermined shape formed on a surface thereof is placed on the resin before the curing, and then, the substrate for transcription and the resin are made to stick together and the resin is cured while rotating the substrate 501. Thereafter, by peeling away the substrate for transcription form the cured resin, the transparent separation layers 503, 504, 506 with the predetermined guide groove formed can be formed.

The cover layer 508, for example, is formed using, as a material, resin such as light curable resin (particularly, ultraviolet curable resin is preferable) and slow-acting heat curable resin, a dielectric or the like, and as the material of the cover layer 508, it is preferable that light absorption of the used laser light is small. As the cover layer 508, resin such as polycarbonate, amorphous polyolefin and polymethylmethacrylate (PMMA), or glass can be used. When as the cover layer 508, the resin such as polycarbonate, amorphous polyolefin and polymethylmethacrylate (PMMA), or glass is used, the cover layer 508 is stuck to the first dielectric film to come into contact in the N-th information layer with resin such as light curable resin (particularly, ultraviolet curable resin is preferable) and slow-acting heat curable resin, thereby forming the cover layer 508.

Ag, Ag alloy or the like is used for the reflective film 510 in each of the information layers, and it is more preferable that a film thickness of the reflective film 510 is within a range of 3 nm to 250 nm. A reason for this is that when the film thickness of the reflective film 510 is thinner than 3 nm, cooling capacity becomes insufficient, thereby making a decrease in signal amplitude large, which is not preferable. On the other hand, when it is thicker than 250 nm, while it does not make a difference in cooling capacity, there is a problem that manufacturing time and material cost are increased, thereby making manufacturing cost higher.

In the respective information layers, for the second dielectric film 511 formed on the reflective film 510, a material such as an oxidation product, for example, $SiO_2$, $ZrO_2$, $Cr_2O_3$, $In_2O_3$, $TiO_2$ or the like, or a composite oxide thereof, or nitride or $ZnS$—$SiO_2$ or the like. More preferably, a material with a small light absorption, whose extinction coefficient is 0.15 or less to the wavelength 405 nm is used. It is preferable that a film thickness of the second dielectric film 511 is 3 nm to 50 nm. A reason for this is that when the film thickness of the second dielectric film 511 is thinner than 3 nm, decrease in signal amplitude becomes large, and when it is thicker than 50 nm, decrease in transmissivity due to absorption of the film becomes large.

For the interface film 512 in each of the information layers, an oxidation product such as, for example, $SiO_2$, $ZrO_2$, $Cr_2O_3$, $In_2O_3$, and $TiO_2$, or a composite oxide thereof, nitride or the like is used. More preferably, a material with a small light absorption, whose extinction coefficient is 0.15 or less to the wavelength 405 nm is used. It is preferable that a film thickness of the interface film 512 is 2 nm to 10 nm. A reason for this is that when the film thickness of the interface film 512 is thinner than 2 nm, an effect of suppressing elemental diffusion to the recording film decreases, so that adhesion decreases, and that on the other hand, when it is thicker than 10 nm, decrease in transmissivity due to absorption of the film becomes large.

For the recording film 513 in each of the information layers, a phase-change material formed of an alloy composed of GeSbTe or GeBiTe is used. Among all, a phase-change material formed of an alloy composed of GeTe—$Sb_2Te_3$ or GeTe—$Bi_2Te_3$ is more preferable, because it has a large optical change amount, and a high-speed phase change is performed. It is preferable that a thickness of the recording film 513 is 2 nm to 30 nm. A reason for this is that when the film thickness is thinner than 2 nm, rewriting (erasure) performance decreases, and decrease in signal amplitude becomes large, and that on the other hand, when it is thicker than 30 nm, the signal amplitude decreases, and signal preserving performance (archival performance) decreases.

The n-th information layer 505, which is the intermediate information layer, and the transmissivity adjustment films 515 in the N-th information layer 507 has an action of adjusting a transmissivity of the n-th information layer. Formation of the transmissivity adjustment film 515 can both increase a transmissivity T (%) of the information layer of interest when the recording film 513 is in a crystalline state, and a transmissivity Ta (%) of the information layer of interest when the recording film 513 is in a noncrystalline state. Moreover, the transmissivity adjustment film 515 also has a function of quickly diffusing heat generated in the recording film 513 to the reflective film 510, thereby cooling the recording film 513. In order to increase the transmissivity, it is preferable that a refractive index n1 and an attenuation coefficient k1 of the transmissivity adjustment film 515 satisfy $n1 \geq 2.0$ and $k1 \leq 0.1$. More preferably, the refractive index n1 and the attenuation coefficient k1 of the transmissivity adjustment film 515 satisfy a relation of $2.0 \leq n1 \leq 3.0$ and a relation of $k1 \leq 0.08$. Setting the refractive index n1 and the attenuation coefficient k1 in the transmissivity adjustment film 515 in this manner allows the transmissivity adjustment film 515 with a high transmissivity to be formed, which makes the preferable intermediate information layer. For the transmissivity adjustment film 515, an oxidation product such as $TiO_2$, $ZrO_2$, $HfO_2$, $ZnO$, $Nb_2O_5$, $Ta_2O_5$, $Bi_2O_3$, $Y_2O_3$, and $CeO_2$, nitride or the like can be used.

The film thickness of each of the layers in the multilayer information recording medium 100 is adjusted, and the recording film 513 of each of the information layers is initiated into a crystalline state, that is, in a form where the initialization processing to the multilayer information recording medium 100 has been completed, it is preferable that the reflection ratio of the each of the information layers to the laser light of the wavelength 405 nm is at an equal level. Here, the equal level of the reflection ratio indicates that if a reflection ratio of the information layer whose reflection ratio is maximum is $R_{max}$, a reflection ratio of the information layer whose reflection ratio is minimum is $R_{min}$, $(R_{max}-R_{min})/R_{max} \leq 0.5$ is satisfied. The reflection ratio to the laser light of the wavelength 405 nm from a surface of the cover layer 508 is about 4%.

[Initialization Method]

Next, an initialization method according to Embodiment 1 is described. An initialization object is the multilayer information recording medium 100 including three or more information layers shown in FIG. 4.

Figure 6:
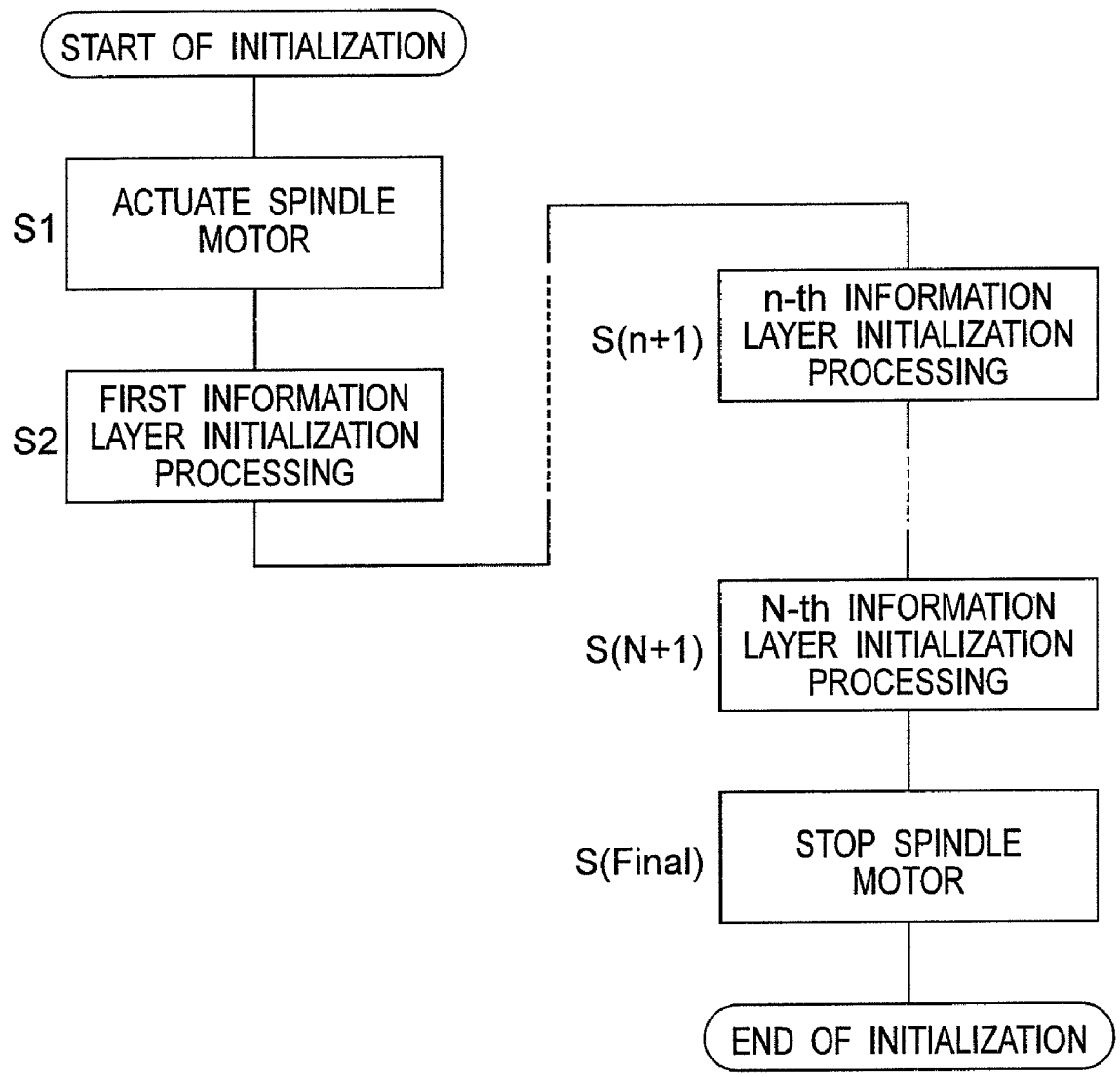
FIG. 6 is a flow chart schematically showing an initialization method according to Embodiment 1 of the present invention.

FIG. 6 is a flow chart showing a major flow in the initialization method according to Embodiment 1. First, in step S1, the initialization apparatus starts up and starts the initialization. Specifically, the multilayer information recording medium 100, which is the initialization object, is attached to an information-recording-medium attaching part with the spindle motor 2 and is rotated. Next, in step S2, the information layer at the farthest position from the light-beam incidence surface, that is, the initialization processing to the recording film of the first information layer 502 in the multilayer recording medium 100 is performed. When the initialization processing to the recording film of the first information layer 502 ends, the initialization processing to the recording film of the next second information layer is performed. When the initialization processing to the recording film of the second information layer ends, the initialization processing to the recording film of the information layer in a direction of the cover layer 508 as the next information layer is performed. In this manner, the initialization processing is sequentially performed to the recording films of the respective information layers from the substrate 501 side toward the direction of the cover layer 508. In the flow chart shown in FIG. 6, as step S(n+1), the initialization processing of the n-th information layer 505, which is the intermediate information layer, is performed, and as step S(N+1), the initialization processing of the information layer the closest to the cover layer 508, that is, the N-th information layer 507 closest to the light-beam incidence surface. However, n and N have a relationship of $2 \leq n < N$. In step S(N+1), when the initialization processing to the recording film of the N-th information layer 507 closest to the light-beam incidence surface in the multilayer information recording medium 100 ends, the initialization processing to all the information layers ends, and the rotation of the spindle motor 2 stops to complete the initialization to the multilayer information recording medium 100 (step S(Final)).

In the initialization method according to Embodiment 1, in the initialization processing to the first information layer 502 of step S2 shown in FIG. 6, the focus adjustment is performed using the first light beam A as the light beam for initialization, and based on the adjustment result, the initialization processing is performed. This is because the transmissivity need not be lower in the first information layer 502, and thus the amount of reflected light from the first information layer 502 is set to be large.

In the initialization method according to Embodiment 1, the wavelength of the first light beam A from the first light source 10 is 805 nm, and the wavelength of the second light beam B from the second light source 11 is 405 nm, which is the same as that of the light beam of the recording and reproduction of the multilayer information recording medium 100.

Figure 7:
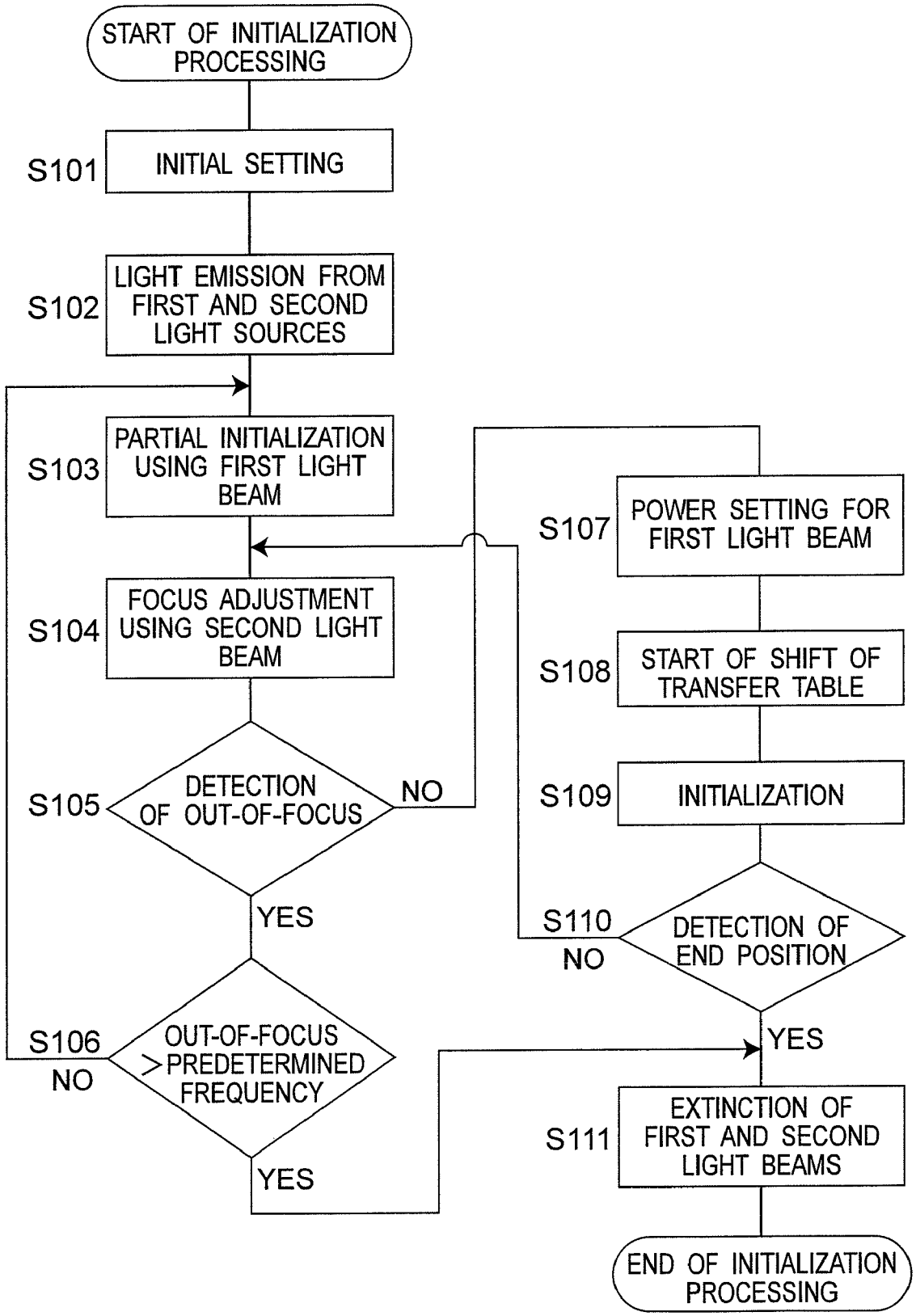
FIG. 7 is a flow chart showing main parts of the initialization method according to Embodiment 1 of the present invention.

FIG. 7 is a flow chart showing detailed steps of the initialization processing of the n-th information layer 505 in step S(n+1) shown in FIG. 6. That is, the initialization processing in the n-th information layer 505 as the intermediate information layer is conducted by the same steps.

First, in step S101, initial setting for the initialization processing of the n-th information layer 505 of interest is made. Specifically, the transfer table 4 is moved at an initialization starting position, and a distance between the surface of the cover layer 508 (light-beam incidence surface) of the multilayer information recording medium 100 and the objective lens 20 (refer to FIG. 2) is adjusted to be a predetermined distance set in advance.

Next, in step S102, the first light source 10 and the second light source 11 are caused to emit light with powers set in advance.

Next, in step S103, the partial initialization is performed using the first light beam A from the first light source 10. In this partial initialization, a portion of the recording film in a region not used for recording and reproduction (an initialization region for focus adjustment, for example, a region in an innermost periphery of the disk) in the multilayer information recording medium 100 is initialized (crystallized). In the partial initialization, the focus position of the first light beam A sufficient for the initialization (crystallization) is relatively reciprocated in the thickness direction (vertical direction) with respect to the multilayer information recording medium 100. In the partial initialization, the first light source 10 is driven by the first drive circuit 6A based on the control signal from the optical controller 8. In this manner, by shaking the focus position of the first light beam A having the power sufficient for the initialization in the thickness direction (vertically), portions of the recording films of the other information layers including the recording film of the n-th information layer are initialized.

In the above described partial initialization, a shaking width (vertical movement distance) of the first light beam A is set so that the portion of the recording film of the n-th information layer 505 is securely initialized, or the portions of all the recording films of the first information layer 501 to the N-th information layer 507 are securely initialized. In this manner, the portion of the recording film of the n-th information layer 505 is initialized, by which the amount of reflected light from the recording film of the n-th information layer 505 to the second light beam for focus adjustment (the wavelength is 405 nm) is increased, and the focus error signal having a sufficiently high level in the n-th information layer 505 is detected.

A number of the reciprocating motions (vertical motions) in the thickness direction to the focus position of the first light beam A in the partial initialization is counted in the optical controller 8, and the partial initialization is controlled in accordance with a number of counts.

In the multilayer information recording medium 100, the power of the first light beam A is changed between in the direction from the light beam incidence surface, which is the surface of the cover layer 508, to the substrate 501 side (hereinafter, referred to as upward), and in the opposite direction from the substrate 501 side to the light beam incidence surface (hereinafter, referred to as downward). For example, it is more preferable that the power when the first light beam A moves downward is higher than the power when it moves upward. This is because if the power when it moves from the cover layer 508 side to the substrate 501 side, that is, moves upward is higher, the information layers closer to the cover layer 508 are initialized before the information layers closer to the substrate 501. In this manner, when the information layers closer to the cover layer 508 on the front side are initialized, the transmissivities of the initialized information layers on the front side largely decrease, and no energy is not put in the information layers closer to the substrate 501 on the back side, which makes the partial initialization difficult.

In step S104, the focus error signal from the second focus error circuit 27 is inputted to the focus-position control circuit 29 through the switching circuit 28. The focus-position control circuit 29 controls the drive of the voice coil 19 based on the focus error signal from the focus error detector 23 to perform the position adjustment of the objective lens 20, so that the second light beam B is focused on the position of the recording film 513 of the n-th information layer 505.

Next, in step S105, based on the focus error signal at that time, it is checked whether or not the second light beam B to the recording film 513 of the n-th information layer 505 is out of focus. If it is out of focus, the processing moves to step S106.

In step S106, if a number of out-of-focuses is within a predetermined value (e.g., five times), the steps of the initialization in step S103 and later are performed again. On the other hand, in step S106, if it is detected that the number of out-of-focuses has exceeded the predetermined value (e.g., five times), it is determined that the multilayer recording medium 100 is abnormal, and the processing moves to step S111, where the first light beam A and the second light beam B are extinguished and the initialization processing operation is forcibly ended.

If the out-of-focus does not occur in step S105, in step S107, The power of the first light beam A is set to be suitable for the initialization. In step S108, the movement of the transfer 4 is started.

The order of the power setting of the first light beam A and the start of the movement of the transfer table 4 in step S107 and in step S108 may be reversed. Moreover, in steps S101 to S108, the processing needs to be performed outside the region of the data recording and reproduction in the multilayer information recording medium 100.

In step S109, the transfer table 4 is driven to move in the radial direction of the multilayer information recording medium at a feeding speed decided in advance. In this manner, the multilayer information recording medium 100 is irradiated with the first light beam A with the predetermined power set while the transfer table 4 is moving in the radial direction of the rotating multilayer information recording medium 100, by which the initialization to the recording film of the n-th information layer 505 is performed.

After a predetermined time of period has passed since the initialization processing started, in step S110, it is determined whether or not the transfer table r has reached an initiation end position. If the transfer table 4 has not reached the initiation end position, the processing returns to step S104, where the focus adjustment by the second light beam B is performed and based on the focus error signal at this time, it is checked whether or not the second light beam B to the recording film 513 of the n-th information layer 505 is out of focus. The processing in steps S106 to S110 is repeated.

In step S110, if it is determined the transfer table 4 reaches an initialization end position, in step S111, the first light beam A and the second light beam B are extinguished, and the initiation processing to the recording film of the n-th information layer 505 ends.

While the flow chart shown in FIG. 7 illustrates an initialization processing to the recording film 513 of the n-th information layer 505, in the initialization method according to Embodiment 1, similar processing is performed as the initialization processing to the recording film 513 of the N-th information layer 507 closest to the light-beam incidence surface.

Moreover, while in the flow chart shown in FIG. 7, a description has been given, taking the example in which in the respective steps of the initialization processing operation to the recording films of the respective information layers, after the partial initialization (step S013) is performed, the focus adjustment is performed, utilizing the partial initialization first performed to the multilayer information recording medium 100, the focus adjustment in the subsequent step may be performed, and to thereby perform the initialization processing to the information layer of interest.

While in the initialization method according to Embodiment 1, a description has been given, taking the example in which for the initialization processing of the recording film 513 of the first information layer 502, the focus adjustment is performed using the first light beam A for initialization is performed, the initialization processing to the recording film of the first information layer 502, the initialization processing to the recording film of the first information layer 502 may be performed by another initialization method. That is, the initialization method performed to the recording film of the n-th information layer 505 shown in FIG. 7 may be performed to the first information layer 502.

Moreover, while in the initialization method according to Embodiment 1, a description has been given, taking the example in which for the initiation processing of the recording film of the N-th information layer 507, as shown in FIG. 7, the focus adjustment is performed using the second light beam B for focus adjustment after the partial initialization, and based on the adjustment result, the overall initialization processing is performed by the first light beam A, for the initialization processing to the recording film of the N-th information layer 507, the focus adjustment may be performed by the light beam A, and based on the adjustment result, the initialization processing by the first light beam A may be performed. This is because as to the recording film of the N-th information layer 507 closest to the light-beam incidence surface, as indicated in the focus error signal of the fourth information layer 308 in the foregoing FIG. 11E, its level is high even in the focus error signal by the first light beam A, and thus, it is possible to focus on the recording film 513 of the N-th information layer 507.

As described above, in the initialization method and the initialization apparatus according to Embodiment 1 of the present invention, the focus adjustment can be performed to the recording films of the respective information layers in the multilayer information recording medium, and the secure initialization processing can be performed to the respective recording films.

Embodiment 2

Hereinafter, an initialization method and an initialization apparatus according to Embodiment 2 of the present invention are described. A different point in Embodiment 2 from Embodiment 1 is the initialization method. Since the initialization apparatus according to Embodiment 2 has a substantially similar configuration to the configuration of the initialization apparatus according to Embodiment 1, the same reference numerals are give to components and the like having the same functions and configurations in Embodiment 2 as those in Embodiment 1, and the descriptions in Embodiment 1 are applied to descriptions therein.

The initialization method according to Embodiment 2 is an initialization method in which chromatic aberration of a collected light beam caused by a wavelength difference between the two light beams to eliminate initialization unevenness, so that high-precision stable initialization processing can be performed.

In the initialization method according to Embodiment 2 as well, similar to the initialization method according to Embodiment 1 shown in FIG. 6, the initiation processing is performed to the respective recording films from the first information layer 502 on the substrate side to the N-th information layer 507 on the cover layer side in order.

Figure 8:
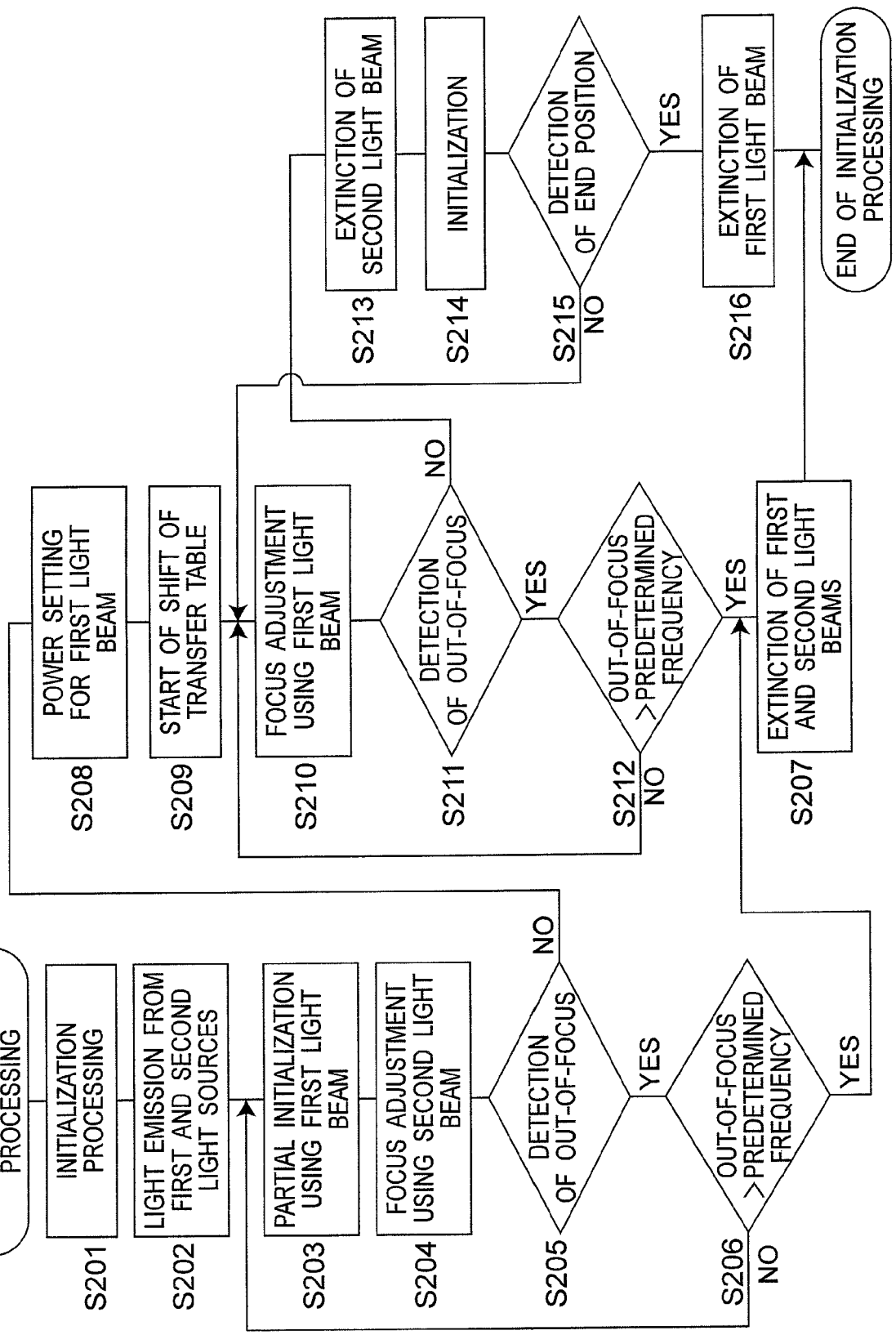
FIG. 8 is a flow chart showing main parts of an initialization method according to Embodiment 2 of the present invention.
Figure 9:
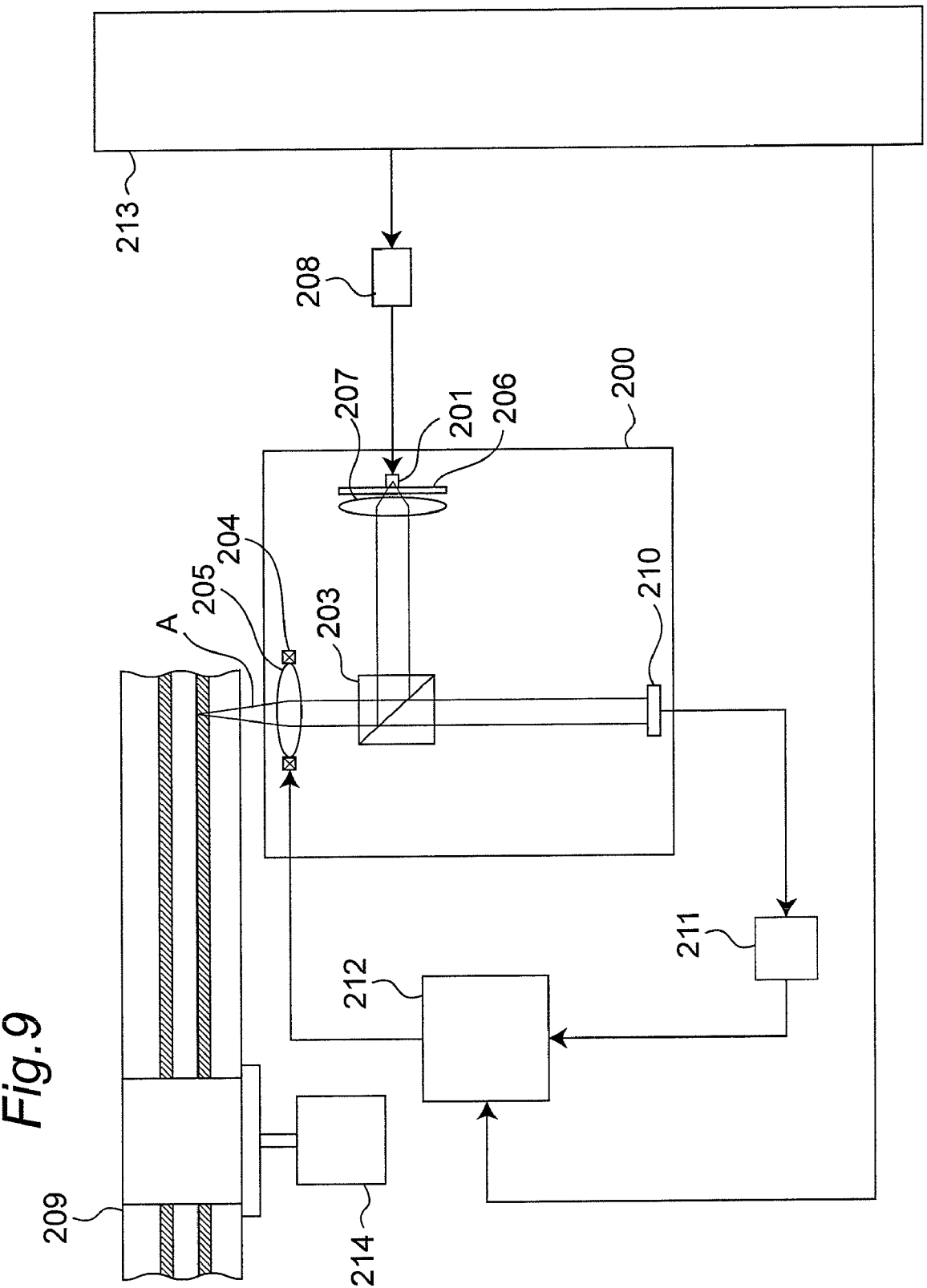
FIG. 9 is a block diagram showing a configuration of an initialization apparatus for a conventional information recording medium.

A flow chart shown in FIG. 8 is a flow chart showing detailed steps of the initialization processing of the n-th information layer 505 in step S(n+1) shown in FIG. 6. That is, the initialization processing in the n-th information layer 505, which is the intermediate information layer, is conducted by all the same steps in the initialization method according to Embodiment 2.

First, in step S201, initial setting for the initialization processing of the n-th information layer 505 of interest is made. Specifically, the transfer table 4 is moved at the initialization starting position, and the distance between the surface of the cover layer 508 (light-beam incidence surface) of the multilayer information recording medium 100 and the objective lens 20 (refer to FIG. 2) is adjusted to be the predetermined distance set in advance.

Next, in step S202, the first light source 10 and the second light source 11 are caused to emit light with the powers set in advance.

Next, in step S203, the partial initialization is performed using the first light beam A from the first light source 10. In this partial initialization, a portion of the recording film in the region not used for recording and reproduction (the initialization region for focus adjustment, for example, the region in the innermost periphery of the disk) in the multilayer information recording medium 100 is initialized (crystallized). In the partial initialization, as described in Embodiment 1, the focus position of the first light beam A sufficient for the initialization (crystallization) is relatively reciprocated in the thickness direction (vertical direction) with respect to the multilayer information recording medium 100. In this manner, by shaking the focus position of the first light beam A having the power sufficient for the initialization in the thickness direction (vertically), portions of the recording films of the other information layers including the recording film of the n-th information layer are initialized. The partial initialization in the initialization method of Embodiment 2 is conducted similarly to the initialization method of Embodiment 1.

In the initialization method according to Embodiment 2, the number of the reciprocating motions (vertical motions) in the thickness direction to the focus position of the first light beam A in the partial initialization is counted in the optical controller 8, and the partial initialization is controlled in accordance with the number of counts.

Moreover, in the initialization method according to Embodiment 2, similarly to the initialization method according to Embodiment 1, in the multilayer information recording medium 100, the power of the first light beam A is changed between in the direction from the light beam incidence surface, which is the surface of the cover layer 508, to the substrate 501 side (hereinafter, referred to as upward), and in the direction from the substrate 501 side to the light beam incidence surface (hereinafter, referred to as downward), and the power when the first light beam A moves downward is set to be higher than the power when it moves upward.

In step S204, the focus error signal from the second focus error circuit 27 is inputted to the focus-position control circuit 29 through the switching circuit 28. The focus-position control circuit 29 controls the drive of the voice coil 19 based on the focus error signal to perform the position adjustment of the objective lens 20, so that the second light beam B is focused on the position of the recording film 513 of the n-th information layer 505.

Next, in step S205, based on the focus error signal at that time, it is checked whether or not the second light beam B to the recording film 513 of the n-th information layer 505 is out of focus. If it is out of focus, the processing moves to step S106.

In step S206, if the number of out-of-focuses is within the predetermined value (e.g., five times), the steps of the initialization in step S203 and later are performed again. On the other hand, in step S206, if it is detected that the number of out-of-focuses has exceeded the predetermined value (e.g., five times), it is determined that the multilayer recording medium 100 is abnormal, and the processing moves to step S207, where the first light beam A and the second light beam B are extinguished and the initialization processing operation is forcibly ended.

If the out-of-focus does not occur in step S205, in step S208, The power of the first light beam A is set to be suitable for the initialization. In step S209, the movement of the transfer 4 is started.

The order of the power setting of the first light beam A and the start of the movement of the transfer table 4 in step S208 and in step S209 may be reversed.

Next, in step S210, the focus error signal from the first focus error circuit 26 is inputted to the focus-position control circuit 29 through the switching circuit 28. In the focus-position control circuit 29, fine adjustment of the position with respect to the objective lens 20 is performed in accordance with the focus error signal from the first focus error circuit 26, and the second beam B is focused on the recording film 513 of the n-th information layer 505 at high precision.

In the initialization method according to Embodiment 2, after the focus adjustment is performed by the focus error signal from the second focus error circuit 27, and the focus adjustment is further performed by the focus error signal from the first focus error circuit 26. This intends to compensate chromatic aberration of the light beam obtained by collecting the two light beams to eliminate the unevenness in the initiation, so that high-precision stable initialization processing can be performed.

Next, in step S211, based on the focus error signal by the first light beam A, it is checked whether or not the first light beam A is out of focus with respect to the position of the recording film 513 of the n-th information layer 505. If it is out of focus, the processing moves to step S212.

In step S212, if the number of out-of-focuses is within the predetermined value (e.g., five times), the steps of the focus adjustment by the first light beam A in step S210 and the out-of-focus detection in step S211 are performed again. On the other hand, in step S212, if it is detected that the number of out-of-focuses has exceeded the predetermined value (e.g., five times), it is determined that the multilayer recording medium 100 is abnormal, and the processing moves to step S207, where the first light beam A and the second light beam B are extinguished and the initialization processing operation is forcibly ended.

The step of the focus adjustment by the first light beam A in step S210 and the step of the out-of-focus detection in step S211 may be performed while moving the transfer table 4, or may be performed after stopping the transfer table 4. However, the processing in steps S201 to S212 need to be performed outside the data regions in the multilayer information recording medium 100. Accordingly, when the initialization processing in step S214 described later starts, the initialization processing starts is set at a start point of the data region in the recording film 513 of the n-th information layer 505 in the multilayer information recording medium 100.

Next, in step S213, the second light beam B is extinguished. When there is no possibility that the multilayer information recording medium 100 of the initialization object is unnecessarily initialized by second light beam B, step A213 can be omitted.

In step S209, the transfer table 4 is driven to move in the radial direction of the multilayer information recording medium 100 at a feeding speed decided in advance. In this manner, the transfer table 4 moves in the radial direction of the rotating multilayer information recording medium 100 and arranged at the starting point of the recording film to be initialized, the multilayer information recording medium 100 is irradiated with the first light beam A with the predetermine power set, by which the initialization to the recording film of the n-th information layer 505 (step S214).

the movement start step of the transfer table 4 in step S209 may be performed after the light extinction of the second light beam B in step S213 before the initiation processing in step S214.

After a predetermined period of time has passed since the initialization processing started in step S214, it is determined whether or not the transfer table 4 has reached the initialization end position. If the transfer table 4 has not reached the initialization end position, the processing returns to step S210, and the focus adjustment is performed based on the focus error signal by the first light beam A. In step S211, it is checked whether the out-of-focus to the recording film of the n-th information layer 505 has occurred. The initialization processing is then performed again. At this time, since the second light beam B is extinguished, Step S213 is not conducted.

In step S215, if it is determined that the transfer table 4 has reached the initialization end position, in step S216, the first light beam A is extinguished, and the initialization processing to the recording film 513 of the n-th information layer 505 ends.

While the flow chart shown in FIG. 8 is the initialization processing to the recording film of the n-th information layer 505, in the initialization method according to Embodiment 2, similar processing is performed as the initialization processing to the recording film 513 of the N-th information layer 507 closest to the light-beam incidence surface.

Moreover, while in the flow chart shown in FIG. 8, a description has been given, taking the example in which in the respective steps of initialization processing operation to the recording films of the respective information layers, the focus adjustment is performed after the initial initialization (step S203), utilizing the partial initialization first performed to the multilayer information recording medium 100, the focus adjustment in the subsequent step may be performed to the initialization to the information layer of interest.

In the initialization method according to Embodiment 2, for the initialization processing of the recording film of the first information layer 502, the focus adjustment is performed using the first light beam A for initialization, or the initialization method performed to the recording film of the n-th information layer 505 shown in FIG. 8 may be similarly performed to the first information layer 502.

Moreover, in the initialization method according to Embodiment 2, the initialization processing of the recording film of the n-th information layer 507 may be performed by the initialization method shown in FIG. 8, or the focus adjustment may be performed by the first light beam A, and based on the adjustment result, the initialization processing may be performed by the first light beam A. This is because, as to the recording film of the N-th information layer 507 closest to the light-beam incidence surface, as indicated in the fourth information layer 308 in the foregoing FIG. 11E, its level is high even in the focus error signal by the first light beam A, and thus, it is possible to focus on the recording film 513 of the N-th information layer 507.

As described above, in the initialization method and the initialization apparatus according to Embodiment 2 of the present invention, the focus adjustment can be securely performed to the multilayer information recording medium including the plurality of information layers, and even initialization can be securely performed. Moreover, in the initialization method and the initialization apparatus according to Embodiment 2, since the focus adjustment to the recording film of the information layer to be subjected to the initialization is also performed by the first light beam A performing the initialization, more uniform and more even initialization can be formed.

As described in Embodiment 1 and Embodiment 2, in the initialization method and the initialization apparatus for the information recording medium according to the present invention, all the information layers of the multilayer information recording medium including the plurality of information layers, specifically, three or more information layers, can be stably and securely initialized.

EXAMPLE 1

Hereinafter, using specific examples of the initialization method and the initialization apparatus of the information recording medium of the present invention, the present invention is described in greater detail.

In a first example, the initialization method shown in FIG. 7, which has been described in Embodiment 1, was carried out to the multilayer information recording medium including three information layers (N=3).

A design was made such as a phase-change material composed of GeBiT was applied to the recording films of the respective information layers of the multilayer information recording medium of an initial object, thereby resulting in reflection ratios 3 to 4% from the respective information layers after the initialization.

As to the two light beams used in the initialization method, the wavelength of the first light beam A is 810 nm, and the wavelength of the second light beam B is 405 nm. For the first light beam A, an optical mechanism is designed such that an the spot shape has a length of 96 μm in the radial direction of the multilayer information recording medium, and has a length of 1 μm in the circumferential direction. The spot shape of the second light beam B is a circular with a diameter of 1 μm, In the initialization method of the first example, the initialization by the first light beam A in step S103 shown in FIG. 7 was performed to the recording film in all the information layers. That is, the focus position of the first light beam A was largely reciprocated a plurality of times in the thickness direction (vertically), of the multilayer information recording medium to perform the partial initialization of the all the recording films.

In the initialization method of the first example to the multilayer information recording medium including three information layers, using the initialization method according to Embodiment 1 shown in the flow chart of FIG. 7, the initialization was conducted.

First, the initialization processing of the first information layer, which is on the substrate side, was performed. In the initialization processing to this first information layer, the focus adjustment by the first beam A was performed instead of performing the initialization in step S103 shown in FIG. 7, and the initialization was performed by the first light beam A. The linear speed to the multilayer information recording medium at the time of the initialization processing was 8 m/s, the feeding speed of the transfer table 4 is 20 μm, and the power of the first power source 10 is 2400 mW.

After the initialization processing of the recording film of the first information layer, the initialization processing to the recording film of the second information layer was conducted. In the initialization processing of the second information layer, the partial initialization in step S103 shown in FIG. 7 was conducted to the recording films of the all the information layers. The linear speed to the multilayer information recording medium at time of this initialization processing was 8 m/s, the feeding speed of the transfer table 4 is 20 μm, and the power of the first power source 10 is 1500 mW.

After the initialization processing of the recording film of the second information layer, finally, the initialization processing to the recording film of the third information layer was conducted. In the initialization processing to this third information layer, the focus adjustment by the first beam A was performed instead of performing the initialization in step S103 shown in FIG. 7, and the initialization was performed by the first light beam A. The linear speed to the multilayer information recording medium at the time of the initialization processing was 8 m/s, the feeding speed of the transfer table 4 is 20 μm, and the power of the first power source 10 is 1000 mW.

As described above, in the multilayer information recording medium including three information layers, the initialization method according to Embodiment 1 shown in FIG. 7 was conducted to the intermediate information layer (second information layer), by which the recording films in all the information layers could be stably and evenly initialized.

EXAMPLE 2

In a second example, the initialization method described using FIG. 8 in Embodiment 2 was carried out to the multilayer information recording medium including four information layers (N=4).

For the multilayer information recording medium of an initialization object in the second example, similarly to the multilayer information recording medium of the foregoing first example, a design was made such as a phase-change material composed of GeBiT was applied to the recording films of the respective information layers, thereby resulting in reflection ratios 3 to 4% from the respective information layers after the initialization.

A specification of the two light beams used in the initialization method of the second example is the same as that of the first light beam A and the second light beam B of the foregoing first example. Moreover, the initialization apparatus used in the first example and the second example is the initialization apparatus described in Embodiment 1.

In the initialization method of the second example to the multilayer information recording medium including four information layers, using the initialization method according to Embodiment 2 shown in the flow chart of FIG. 8, the initialization was conducted.

First, the initialization processing of the first information layer, which is on the substrate side, was performed. In the initialization processing to this first information layer, the focus adjustment by the first beam A was performed instead of performing the initialization in step S203 shown in FIG. 8, and the initialization was performed by the first light beam A. The linear speed to the multilayer information recording medium at the time of the initialization processing was 8 m/s, the feeding speed of the transfer table 4 is 20 μm, and the power of the first power source 10 is 3800 mW.

After the initialization processing of the recording film of the first information layer, the initialization processing to the recording film of the second information layer was conducted. In the initialization processing of the second information layer, the partial initialization in step S203 shown in FIG. 8 was conducted to the recording films of the all the information layers. The linear speed to the multilayer information recording medium at time of this initialization processing was 8 m/s, the feeding speed of the transfer table 4 is 20 μm, and the power of the first power source 10 is 2600 mW.

After the initialization processing of the recording film of the second information layer, the initialization processing to the recording film of the third information layer was conducted. In the initialization processing to this third information layer, the partial initialization in step S203 shown in FIG. 8 was conducted to the recording films of all the information layers. The linear speed to the multilayer information recording medium at the time of the initialization processing was 8 m/s, the feeding speed of the transfer table 4 is 20 and the power of the first power source 10 is 1400 mW.

After the initialization processing of the recording film of the third information layer, finally, the initialization processing to the recording film of the fourth information layer was conducted. In the initialization processing to the fourth information layer, the focus adjustment by the first beam A was performed instead of performing the initialization in step S203 shown in FIG. 8, and the initialization was performed. The linear speed to the multilayer information recording medium at the time of the initialization processing was 8 m/s, the feeding speed of the transfer table 4 is 20 μm, and the power of the first power source 10 is 1000 mW.

As described above, in the multilayer information recording medium including four information layers, the initialization method according to Embodiment 2 shown in FIG. 8 was conducted to the intermediate information layers (second information layer and third information layer), by which the recording films in all the information layers could be stably and evenly initialized.

While descriptions of the initialization method and the initialization method of the information recording medium of the present invention have been given, taking specific examples in the foregoing examples, the present invention is not limited to the steps and the configurations described in the foregoing examples, and similar steps and configurations based on the technical ideas of the present invention are included in the present invention.

INDUSTRIAL APPLICABILITY

Since the present invention is to provide an initialization method and an initialization apparatus capable of securely initializing an information recording medium including recording films that perform recording and reproduction of information by irradiation with a laser beam or the like, it has excellent effects and is useful in the field of the initialization of an information recoding medium. Particularly, since the present invention can be applied to the initialization of a multilayer information recording medium such as a high-capacity "Blu-ray Disc", that is, a disk having a large capacity and a small diameter of 6 cm, 8 cm or the like, and also, can be applied to the initialization of the next generation of a SIL (Solid Immersion Lens) near-field light multilayer disk, it has high versatility.

DESCRIPTION OF REFERENCE NUMERALS

1 Initialization apparatus
2 Spindle motor
3 Optical head
4 Transfer table
5 Movement means
6 Drive part
7 Focus position control part
8 Optical controller
100 Multilayer information recording medium
10 First light source
11 Second light source
12, 13 Collimator lens
14, 15 Beam splitter
16, 17 Quarter wavelength plate
18 Wavelength selective mirror
19 Voice coil
20 Objective lens
21 Optical path correction means
22 First focus error detector
23 First focus error detector
26 First focus error circuit
27 Second focus error circuit
28 Switching circuit

The invention claimed is:

1. An initialization method for initializing an information recording medium including at least two or more information layers,
the initialization method including steps of:
partially initializing a region of a recording film of the information layer through use of a first light beam having a wavelength for initialization;
irradiating the region of the recording film subjected to the partial initialization with a second light beam having a wavelength corresponding to a wavelength for recording and reproducing information on and from the information recording medium;
adjusting a focus position, based on a focus error signal generated from light which is reflected from the information layer irradiated with the second light beam, and
initializing the recording film in such a manner that the information recording medium is irradiated with the first light beam having the focus position adjusted.

2. The initialization method for the information recording medium according to claim 1, wherein
in the step of partially initializing the region of the recording film through use of the first light beam, the first light beam is used for partially initializing an initialization region for focus adjustment except a recording and reproducing region in the recording film, and
in the step of irradiating the information recording medium with the second light beam, the initialization region for focus adjustment, which is partially initialized, is irradiated with the second light beam.

3. The initialization method for the information recording medium according to claim 2, wherein the number of information layers in the information recording medium is N (N: an integer which is equal to or more than 3).

4. The initialization method for the information recording medium according to claim 1, wherein
in a case where the number of information layers in the information recording medium is N (N: an integer which is equal to or more than 3), and the first information layer, . . . , the n-th information layer (n: an integer which satisfies a relation of $2 \leq n < N$), . . . , and the N-th information layer are arranged sequentially in order of increasing proximity to a light beam incidence side,
in the step of partially initializing the region of the recording film of at least the n-th information layer through use of the first light beam, the first light beam is used for partially initializing the initialization region for focus adjustment except the recording and reproducing region in the recording film, and
in the step of irradiating the information recording medium with the second light beam, the initialization region for focus adjustment, which is subjected to the partial initialization, is irradiated with the second light beam.

5. The initialization method for the information recording medium according to claim 4, wherein
in the step of partially initializing the region of the recording film of the N-th information layer through use of the first light beam, the first light beam is used for partially initializing the initialization region for focus adjustment except the recording and reproducing region in the recording film, and
in the step of irradiating the information recording medium with the second light beam, the initialization region for focus adjustment, which is subjected to the partial initialization, is irradiated with the second light beam.

6. The initialization method for the information recording medium according to claim 3, wherein
in the step of partially initializing the initialization region for focus adjustment,
all the recording films of the N information layers are partially initialized in such a manner that the focus position of the first light beam is reciprocated in a thickness direction of the information recording medium.

7. The initialization method for the information recording medium according to claim 2, wherein
in a case where the focus position of the first light beam is reciprocated in a thickness direction of the information recording medium in the step of partially initializing the initialization region for focus adjustment, a power of the first light beam in a forward operation direction is different from a power of the first light beam in a backward operation direction at the focus position of the first light beam.

8. The initialization method for the information recording medium according to claim 7, wherein
in the case where the focus position of the first light beam is reciprocated in the thickness direction of the information recording medium in the step of partially initializing the initialization region for focus adjustment, a power of the first light beam which approaches the light beam incidence side of the information recording medium is larger than a power of the first light beam which moves away from the light beam incidence side of the information recording medium.

9. The initialization method for the information recording medium according to claim 1, wherein
the wavelength of the first light beam falls within a range from 630 to 850 nm.

10. The initialization method for the information recording medium according to claim 1, wherein
the wavelength of the second light beam falls within a range of ±60 nm with respect to the wavelength for recording and reproducing information on and from the information recording medium.

11. The initialization method for the information recording medium according to claim 1, wherein
the wavelength of the second light beam falls within a range of ±20 nm with respect to the wavelength for recording and reproducing information on and from the information recording medium.

12. The initialization method for the information recording medium according to claim 1, wherein
the second light beam is smaller in spot size than the first light beam.

13. The initialization method for the information recording medium according to claim 1, wherein
the second light beam has a spot position located backward of a spot position of the first light beam with respect to an initialization proceeding direction.

14. The initialization method for the information recording medium according to claim 1, wherein
in a step of aligning the focus position of the first light beam with a position of the recording film,
the focus position is controlled through use of the second light beam, based on the focus error signal generated from the light reflected from the recording film, and then is controlled through use of the first light beam switched from the second light beam.

15. The initialization method for the information recording medium according to claim 14, wherein
upon execution of the initialization of the recording film through use of the first light beam, the recording film is not irradiated with the second light beam.

16. An information recording medium comprising at least two or more information layers, wherein
the information layer includes a recording film in which an initialization region for focus adjustment is formed as a region except a recording and reproducing region, and
the initialization region for focus adjustment is partially initialized using a first light beam having a wavelength for initialization and is irradiated with a second light beam having a wavelength corresponding to a wavelength for recording and reproducing information on and from the information recording medium, and a focus position is adjusted based on a focus error signal generated from light reflected from the information layer, so that the recording film is initialized using the first light beam having the focus position adjusted.

17. The information recording medium according to claim 16, wherein
in the recording film irradiated with the second light beam, a reflectivity in an initialized state is higher than a reflectivity in an uninitialized state.

18. The information recording medium according to claim 16, wherein
a distance between the information layers is equal to or less than 30 μm.

19. An initialization apparatus for initializing a recording film of an information recording medium,
the initialization apparatus comprising at least one optical head for irradiating the recording film with a light beam, wherein
the optical head includes: a first light source for emitting a first light beam having a wavelength for initialization; a second light source for emitting a second light beam having a wavelength corresponding to a wavelength for recording and reproducing information on and from the information recording medium; an objective lens for concentrating the first light beam and the second light beam onto the recording film; and a focus position control part for controlling a focus position of at least one of the light beams.

20. The initialization apparatus for the information recording medium according to claim 19, further comprising
a mechanism for shifting the objective lens for concentrating the light beam onto the recording film, in a thickness direction of the information recording medium.

21. The initialization apparatus for the information recording medium according to claim 19, wherein
the wavelength of the first light beam falls within a range from 630 to 850 nm.

22. The initialization apparatus for the information recording medium according to claim 19, wherein
the wavelength of the second light beam falls within a range of ±60 nm with respect to the wavelength for recording and reproducing the information on and from the information recording medium.

23. The initialization apparatus for the information recording medium according to claim 19, wherein
the second light beam is smaller in spot size than the first light beam.

24. The initialization apparatus for the information recording medium according to claim 19, wherein
the second light beam has a spot position located backward of a spot position of the first light beam with respect to an initialization proceeding direction.

25. The initialization apparatus for the information recording medium according to claim 19, wherein
the focus position control part is configured to control the focus position of the first light beam and the focus position of the second light beam.

26. The initialization apparatus for the information recording medium according to claim 19, wherein
the objective lens has a numerical aperture NA which is equal to or more than 0.6.

* * * * *